(12) United States Patent
Okabe

(10) Patent No.: US 8,639,942 B2
(45) Date of Patent: Jan. 28, 2014

(54) INFORMATION PROCESSING APPARATUS, SOFTWARE UPDATE METHOD, AND IMAGE PROCESSING APPARATUS

(75) Inventor: Kiwamu Okabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1025 days.

(21) Appl. No.: 12/046,202

(22) Filed: Mar. 11, 2008

(65) Prior Publication Data

US 2008/0229114 A1 Sep. 18, 2008

(30) Foreign Application Priority Data

Mar. 15, 2007 (JP) .................................. 2007-067250

(51) Int. Cl.
*G06F 11/30* (2006.01)

(52) U.S. Cl.
USPC ........... 713/189; 713/164; 713/191; 713/193; 717/168; 717/170; 726/9; 726/17

(58) Field of Classification Search
USPC .......................................................... 713/189
See application file for complete search history.

(56) References Cited

U.S. PATENT DOCUMENTS

| | | | |
|---|---|---|---|
| 6,185,678 B1 | 2/2001 | Arbaugh et al. | |
| 6,378,072 B1 | 4/2002 | Collins et al. | |
| 7,194,092 B1 | 3/2007 | England et al. | |
| 7,467,328 B2 * | 12/2008 | Roth et al. | ............... 714/15 |
| 2002/0073316 A1 | 6/2002 | Collins et al. | |
| 2003/0046524 A1* | 3/2003 | Zimmer et al. | ............... 713/1 |
| 2003/0194094 A1 | 10/2003 | Lampson et al. | |
| 2003/0196085 A1 | 10/2003 | Lampson et al. | |
| 2003/0196099 A1 | 10/2003 | Lampson et al. | |
| 2003/0196110 A1 | 10/2003 | Lampson et al. | |
| 2003/0200454 A1* | 10/2003 | Foster et al. | ............... 713/200 |
| 2005/0131990 A1* | 6/2005 | Jewell | ............... 709/201 |
| 2005/0149746 A1* | 7/2005 | Lu et al. | ............... 713/191 |
| 2005/0268115 A1* | 12/2005 | Barde et al. | ............... 713/189 |
| 2006/0005252 A1* | 1/2006 | Chu et al. | ............... 726/26 |
| 2006/0021064 A1 | 1/2006 | England et al. | |
| 2006/0041572 A1* | 2/2006 | Maruyama | ............... 707/101 |
| 2006/0129520 A1* | 6/2006 | Lang | ............... 707/1 |

(Continued)

FOREIGN PATENT DOCUMENTS

| | | |
|---|---|---|
| JP | 2004-282391 | 10/2004 |
| JP | 2005-196745 | 7/2005 |
| WO | 99/39475 | 8/1999 |

OTHER PUBLICATIONS

Sep. 25, 2008 search report in connection with a counterpart European patent application No. 08 15 2627.

*Primary Examiner* — Ashok Patel
*Assistant Examiner* — Gary Gracia
(74) *Attorney, Agent, or Firm* — Cooper & Dunham LLP

(57) ABSTRACT

An information processing apparatus, a software update method, and an image processing apparatus capable of encrypting and decrypting information using values uniquely calculated from booted primary modules or booted backup modules with less effort are disclosed. The information processing apparatus includes primary modules and the same kinds of backup modules, and includes a value storage unit storing values calculated from the modules, an encryption information storage unit storing information unique to the modules, an information decryption unit decrypting the information unique to the modules using the values in the value storage unit, and an encryption information update unit, when the module is updated, encrypting the information unique to the modules based on a value calculated from the each kind of the primary modules or the backup modules after the update.

17 Claims, 21 Drawing Sheets

(56) References Cited

U.S. PATENT DOCUMENTS

| | | | |
|---|---|---|---|
| 2006/0174240 A1* | 8/2006 | Flynn | 717/170 |
| 2006/0200663 A1* | 9/2006 | Thornton | 713/164 |
| 2006/0248162 A1* | 11/2006 | Kawasaki | 709/217 |
| 2006/0265562 A1* | 11/2006 | Nishiguchi et al. | 711/163 |
| 2007/0043972 A1* | 2/2007 | Graham et al. | 714/12 |
| 2007/0083759 A1* | 4/2007 | Drew et al. | 713/168 |
| 2007/0094719 A1* | 4/2007 | Scarlata | 726/9 |
| 2007/0169098 A1* | 7/2007 | Kikuchi | 717/168 |
| 2007/0239774 A1* | 10/2007 | Bodily et al. | 707/103 R |
| 2007/0250673 A1* | 10/2007 | Eidswick | 711/162 |
| 2007/0260775 A1* | 11/2007 | Bita et al. | 710/36 |
| 2007/0268818 A1* | 11/2007 | Sugihara | 370/216 |
| 2008/0060662 A1* | 3/2008 | Oh et al. | 128/897 |
| 2008/0208923 A1* | 8/2008 | Watanabe et al. | 707/202 |

* cited by examiner

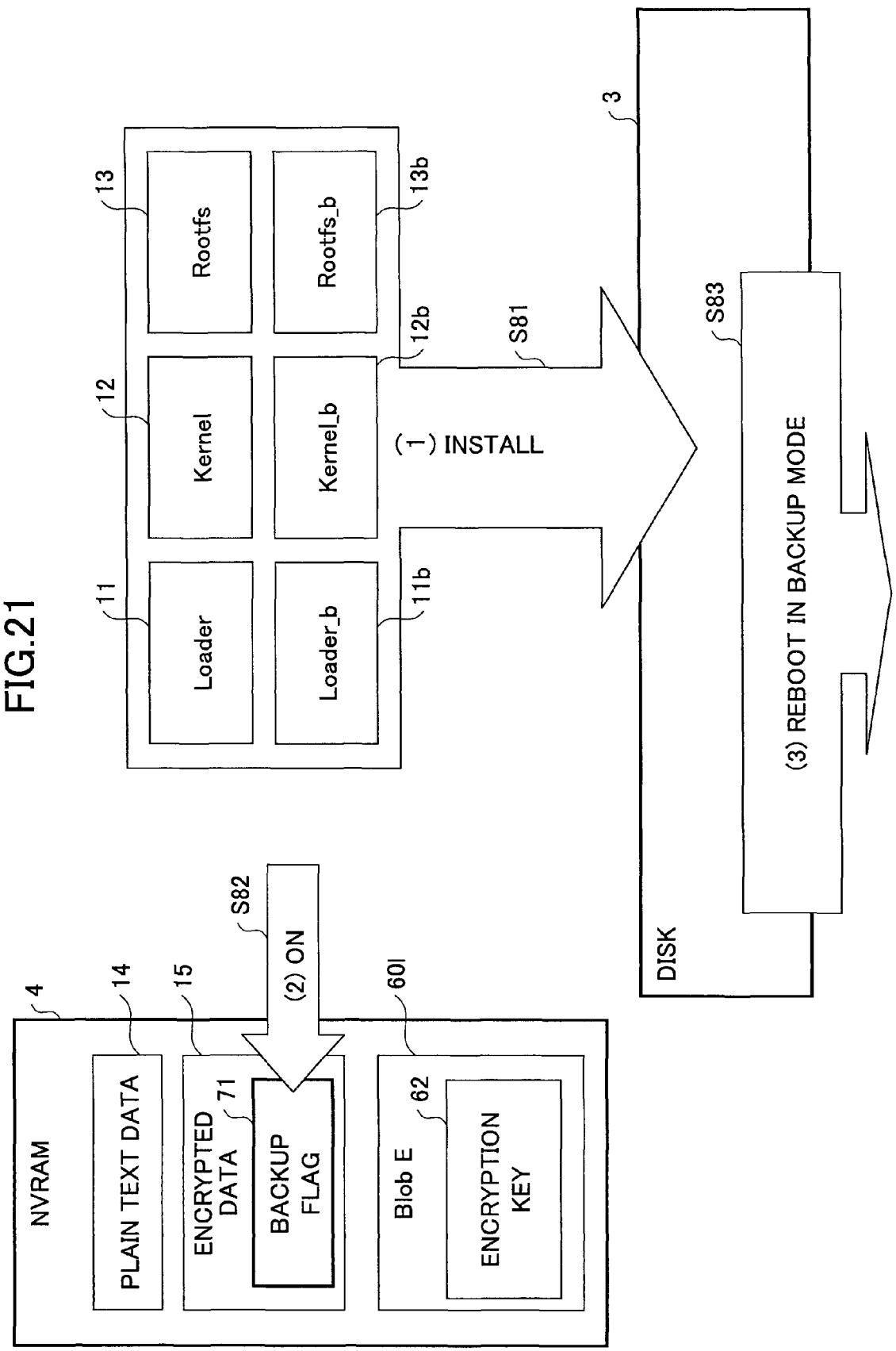

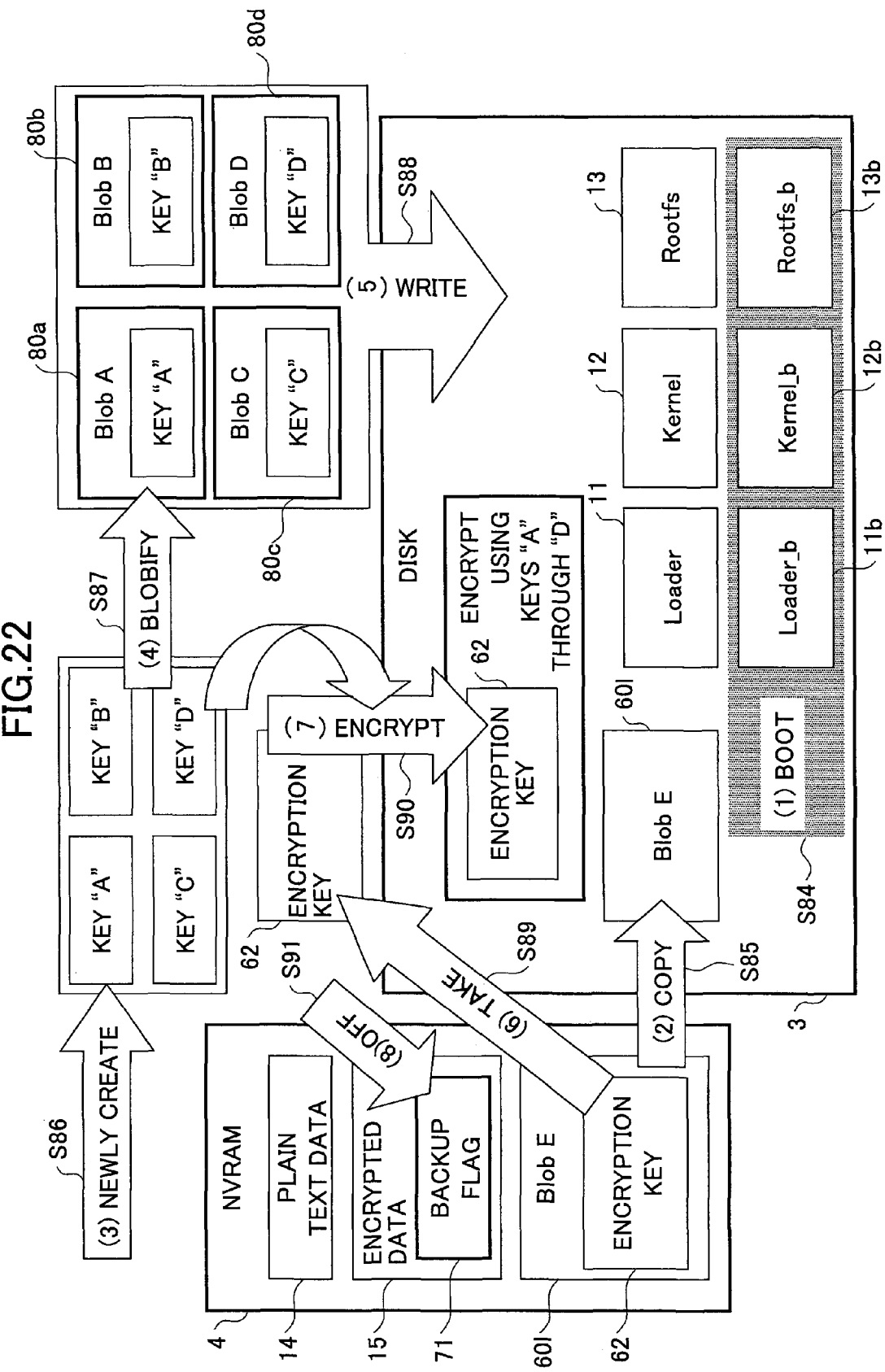

INFORMATION PROCESSING APPARATUS, SOFTWARE UPDATE METHOD, AND IMAGE PROCESSING APPARATUS

BACKGROUND

1. Technical Field This disclosure relates to an information processing apparatus, a software update method, and an image processing apparatus, and more specifically to an information processing apparatus or an image processing apparatus having a primary module and a backup module, and a software update method of the information processing apparatus or the image processing apparatus.

2. Description of the Related Art

As security becomes increasingly critical, information processing apparatuses such as personal computers and image processing apparatuses such as Multi Function Peripherals (MFP) capable of encrypting information stored in the apparatuses to avoid wiretapping have become available lately. For example, Patent Document 1 describes a PC adopting the specifications of Trusted Computing Platform Alliance (TCPA) in which information is encrypted using a Trusted Platform Module (TPM). The TPM is realized in a chip directly mounted on, for example, a motherboard.

On the other hand, to respond to a failure, for example, a duplexing system has been employed in information processing apparatuses such as personal computers and image processing apparatuses such as MFPs. Furthermore, to respond to a bug, a security hole, addition or modification of functions, the programs have also been updated in information processing apparatuses such as personal computers and image processing apparatuses such as MFPs (see, for example, Patent Document 2).

Herein, a conventional method of encrypting and decrypting information using the TPM, and a program update (hereinafter referred to as "ROM update") are briefly described. FIG. 1 shows an exemplary configuration of a conventional information processing apparatus. The information processing apparatus includes a CPU 1, a BIOS ROM 2, a disk 3, a non-volatile (NV) RAM 4, and a main memory 5 as the hardware configuration. The CPU 1, the BIOS ROM 2, the disk 3, the NVRAM 4, and the main memory 5 are connected to each other via a bus 6.

The BIOS ROM 2 stores a Basic Input/Output System (BIOS) 10 module. The disk 3 stores a loader 11, a kernel 12, and a root file system (Rootfs) 13 modules. The NVRAM 4 stores plain text data 14 that users use.

The root file system 13 manages a boot program 21, a ROM update flag control program 22, a blob decryption section 23, and an application 24 that are stored in the disk 3. It should be noted that each of the BIOS 10, the loader 11, the kernel 12, the root file system 13 modules and the like is loaded into the main memory 5 to be executed. In the following, the BIOS 10, the loader 11, the kernel 12, the root file system 13 modules and the like are described as processing subjects.

A boot sequence of the information processing apparatus in FIG. 1 is described with reference to FIG. 2. FIG. 2 is a sequence diagram showing the processes of the information processing apparatus being booted. In step S1, the BIOS 10 loads and boots the loader 11. In steps S3 through S5, the loader 11 loads and boots the kernel 12 and the root file system 13.

In step S6, the kernel 12 boots the boot program 21 in the root file system 13. In step S7, the boot program 21 boots the application 24 in the root file system 13. In step S8, the application 24 is now capable of writing data into the NVRAM 4 and reading, for example, plain data 14 in the NVRAM 4.

Next, a mechanism of the TPM is briefly described. In the following, an example where the loader 11 boots the kernel 12 is described.

FIG. 3 is a diagram schematically showing a process of storing a hash value into the TPM 7. In step S11, the loader 11 loads the kernel 12 from the disk 3 into the main memory 5. In step S12, the TPM 7 stores, for example, a hash value into a Platform Configuration Register (PCR), the hash value being calculated based on a method of generating a fixed-length pseudo random number from an original document. In FIG. 3, a hash value "0x3a" is stored in a "PCR3". In step S13, the loader 11 boots the kernel 12.

In this manner, when the TPM 7 boots, for example, the BIOS 10, the loader 11, the kernel 12 and the root file system 13 modules, the TPM 7 stores hash values calculated from the modules in the PCRs.

FIG. 4 is a drawing schematically showing a decrypting process of the information using the TPM 7. In the TPM 7, four hash values calculated from the corresponding modules are stored in "PCR1" through "PCR4". When the information is decrypted using the TPM 7, a Blob A 41 and a Blob B 42 each including at least one of the "PCR1" through "PCR4" data are used.

In the Blob A 41, a value "0x3a" is stored in the "PCR3". In the Blob B 42, values "0xe9", "0x12", "0x3b", and "0x06" are stored in the "PCR1" through the "PCR4", respectively. In the TPM7, values "0xe9", "0x12", "0x3a", and "0x06" are stored in its "PCR1" through the "PCR4", respectively.

In case of Blob A 41, the same hash value is in the "PCR3" of the Blob A 41 and the "PCR3" of the TPM 7. Therefore, the TPM 7 permits taking the information from the Blob A 41. In case of Blob B 42, a hash value in the "PCR3" of the Blob A 41 is different from that in the "PCR3" of the TPM 7. Therefore, the TPM 7 does not permit taking the information from the Blob A 41. It should be noted that when "no setting" may be stored in, for example, the "PCR1", the "PCR2", and the "PCR4" in the Blob A 41, the TPM 7 does not use the register to determine whether to permit taking the information.

FIG. 5 shows an exemplary configuration of an information processing apparatus having the TPM. The information processing apparatus in FIG. 5 includes the CPU 1, the BIOS ROM 2, the disk 3, the NVRAM 4, the main memory 5, the TPM 7, and a Hard Disk Drive (HDD) 8 as the hardware configuration. The CPU 1, the BIOS ROM 2, the disk 3, the NVRAM 4, the main memory 5, the TPM 7, and a Hard Disk Drive (HDD) 8 are connected to each other via a bus 6.

The configuration of the information processing apparatus in FIG. 5 is different from that in FIG. 1 in that the information processing apparatus in FIG. 5 further includes the TPM 7 and the HDD 8. Furthermore, the disk 3 stores a Blob 43 in addition to the configuration in FIG. 1. The Blob 43 includes an encrypted encryption key 51 for the NVRAM 4. The Blob 43 stores hash values each calculated from the BIOS 10, the loader 11, the kernel 12, and the root file system 13 in the "PCR1" through "PCR4", respectively.

The NVRAM 4 stores encrypted data 15 in addition to the plain text data 14. The HDD 8 stores encrypted data 16. The same reference numerals are used in the figure to describe those components that are identical to the components of FIG. 1 without repeated description. The description of the Blob having an encrypted encryption key of the HDD 8 is also omitted.

A boot sequence of the information processing apparatus in FIG. 5 is described with reference to FIG. 6. FIG. 6 is a sequence diagram showing exemplary processes of the information processing apparatus being booted. In step S21, the BIOS 10 loads the loader 11. In step S22, a hash value of the loader 11 is stored in a PCR of the TPM 7. In step S23, the BIOS 10 boots the loader 11.

In step S24, the loader 11 loads the kernel 12. In step S25, a hash value of the kernel 12 is stored in a PCR of the TPM 7. In step S26, the loader 11 loads the root file system 13. In step 27, a hash value of the root file system is stored in a PCR of the TPM 7.

In step S28, the loader 11 boots the kernel 12 and the root file system 13. In step S29, the kernel 12 boots the boot program 21 in the root file system 13. In steps 30 and 31, the boot program 21 boots the blob decryption section 23 and the application 24 in the root file system 13.

In step S32, the blob decryption section 23 acquires the encryption key 51 for the NVRAM 4 from inside the Blob 43. In step S33 by using the encryption key, the application is now capable of writing encrypted data into the NVRAM 4 and reading encrypted data 14 stored in the NVRAM 4.

Patent Document 1: Japanese Patent Application Publication No. 2004-282391

Patent Document 2: Japanese Patent Application Publication No. 2005-196745

However, in an information processing apparatus having a configuration as shown in FIG. 5, the following problem may occur during the ROM update. FIG. 7 is a drawing schematically illustrating a problem having occurred during the ROM update. In an information processing apparatus having a configuration as shown in FIG. 5, when the BIOS 10 stored in the BIOS ROM 2 is replaced by a new BIOS 10a, the Blob 43 corresponding to the BIOS 10 is required to be updated to a Blob A 43a that corresponds to the BIOS 10a.

Unfortunately, in a conventional information processing apparatus, when an update process from the Blob A 43 to the Blob A 43a is interrupted due to some reason, the hash value stored in the "PCR1" of the TPM 7 may become different from the hash value stored in the "PCR1" of the Blob A 43a. A problem arises that when the hash value stored in the "PCR1" of the TPM 7 becomes different from the hash value stored in the "PCR1" of the Blob A 43a, in that the encryption key 51 for the NVRAM 4 cannot be taken from the Blob 43a, resulting in that the encrypted data stored in the NVRAM 4 cannot be decrypted.

This problem illustrated in FIG. 7 can be solved when an information processing system has a configuration as shown in FIG. 8. The information processing apparatus in FIG. 8 includes a primary system 81 and a backup system 82, constituting a duplex system. The primary system 81 includes the BIOS 10, the loader 11, the kernel 12, and the root file system 13. The backup system 82 includes the BIOS 10b, a loader 11b, a kernel 12b, and a root file system 13b.

It should be noted that the BIOS 10, the loader 11, the kernel 12, and the root file system 13 are included in primary modules, and the BIOS 10b, the loader 11b, the kernel 12b, and the root file system 13b are included in backup modules.

Typically, an information processing apparatus is booted sequentially in an order of the BIOS 10, the loader 11, the kernel 12, and the root file system 13. Hereinafter, a procedure of booting like this is referred to as a "boot path". In the example of FIG. 8, due to an error having occurred in the loader 11, the booth path becomes: BIOS 10 →loader 11b→kernel 12→root file system 13.

That is, in an information processing apparatus having the backup system 82, when a module of the primary system has a problem, the same kind of module in the backup system 82 can usually be booted.

A booth path can be changed by, for example, a ROM update flag control program.

Because of this structure, there is a problem that the same number of Blobs which is equal to the number of booth paths defined by the combination of the modules in the primary system 81 and the modules in the backup system 82 are required to be provide. FIG. 9 is a drawing schematically illustrating a problem that may occur when information is encrypted and decrypted using the TPM in an information processing apparatus having a backup system.

Further, there is another problem in an information processing apparatus having a configuration as shown in FIG. 9 that when the BIOS 10 stored in the BIOS ROM 2 is updated to the BIOS 10a, all of the plural Blobs corresponding to the BIOS 10 are required to be updated so as to correspond to the BIOS 10a. FIG. 10 is a drawing schematically illustrating a problem occurring while information is encrypted and decrypted using the TPM, where the ROM update is executed in an information processing apparatus having a backup system.

As described, when a conventional system is arranged to employ a duplex system having both a primary system and a backup system, have a ROM update capability, and improve the security by adding both an encryption and a decryption capability of information by using the TPM 7, it takes a lot of effort to manage the Blobs 73.

BRIEF SUMMARY

In an aspect of this disclosure, there is provided an information processing apparatus, a method of software update, and an image processing apparatus capable of encrypting and decrypting information using values uniquely calculated from a booted primary module and a booted backup module with much ease.

In another aspect, there is provided an information processing apparatus including one or more kinds of primary modules necessary to boot the apparatus and one or more kinds of backup modules to be used when the primary modules fail, so that the information processing apparatus is booted in a manner that when any kind of the primary modules fails, the same kind of backup module is used. The information. processing apparatus includes a value storage unit storing values uniquely calculated from the one or more kinds of the primary modules or the backup modules used when the apparatus is booted, an encryption information storage unit storing information unique to the each kind of the primary or the backup modules, the information being encrypted based on a value calculated from the each kind of the primary modules or the backup modules, an information decryption unit decrypting the information unique to the each kind of the primary modules or the backup modules using the values in the value storage unit, the information being stored in the encryption information storage unit, and an encryption information update unit, when any of the primary modules or the backup modules is updated, encrypting the information unique to the each kind of the primary modules or the backup modules based on a value calculated from the each kind of the primary modules or the backup modules after the update, the information being stored in the encryption information storage unit.

Further, in yet another aspect, there is provided an image processing apparatus including one or more kinds of primary modules necessary to boot the apparatus, one or more kinds of backup modules to be used when the primary modules fail, a plotter section and scanner section so that the plotter and the scanner sections are booted in a manner that when any kind of the primary modules fails, the same kind of backup module is used. The image processing apparatus includes a value storage unit storing values uniquely calculated from the one or more kinds of the primary modules or the backup modules used when the apparatus is booted, an encryption information storage unit storing information unique to the each kind of the primary or the backup modules, the information being encrypted based on a value calculated from the each kind of the primary modules or the backup modules, an information decryption unit decrypting the information unique to the each kind of the primary modules or the backup modules using the values in the value storage unit, the information being stored in the encryption information storage unit, and an encryption information update unit, when any of the primary modules or the backup modules is updated, encrypting the information unique to the each kind of the primary modules or the backup modules based on a value calculated from the each kind of the primary modules or the backup modules after the update, the information being stored in the encryption information storage unit.

It should be noted that a method, apparatus, system, computer program, recording medium, data structure including a constitutional element, an expression, or a combination of the aforementioned aspects and/or features may be included in any of various exemplary embodiments of the present invention.

According to an exemplary embodiment, there may be provided an information processing apparatus, a method of software update, and/or an image processing apparatus capable of encrypting and decrypting information using values uniquely calculated from a booted primary module and a booted backup module with less efforts.

BRIEF DESCRIPTION OF THE DRAWINGS

The aforementioned and other aspects, features, and advantages would be better understood from the following detailed description when read in conjunction with the accompanying drawings, in which:

FIGS. 21 and 22 are drawings schematically showing a process of decrypting encrypted information in the NVRAM when the disk has crashed.

DETAILED DESCRIPTION OF THE PREFERRED EMBODIMENTS

Next, best modes for carrying out the invention are described with reference to exemplary embodiments of the present invention and accompanying drawings. In the embodiments, an information processing apparatus such as a personal computer is described. However, the embodiment is not limited to such an information processing apparatus, and may be carried out in, for example, an image processing apparatus such as a Multi Function Peripheral (MFP).

[Embodiment 1]

Figure 1:
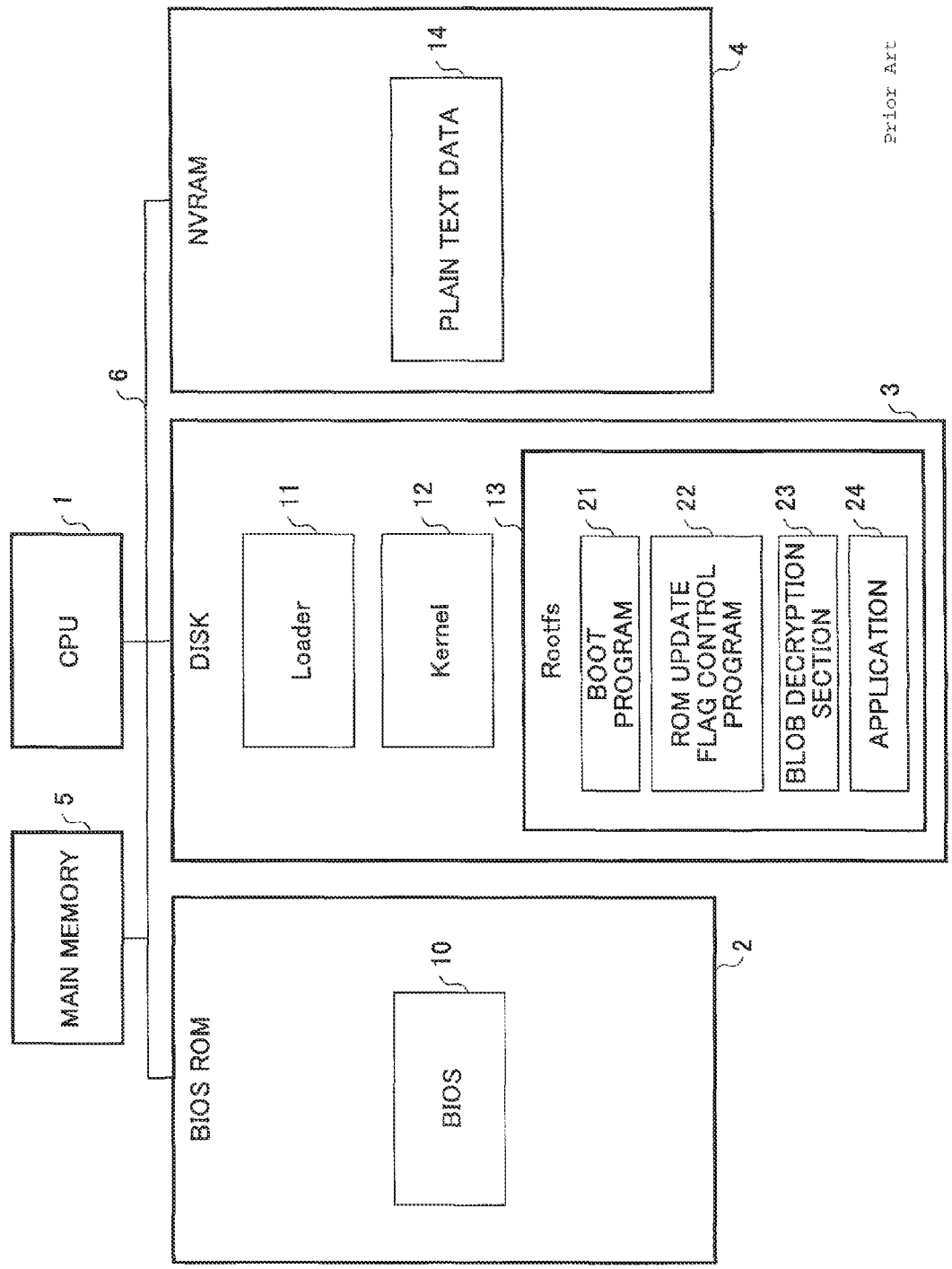
FIG. 1 is a drawing showing an exemplary configuration of a conventional information processing apparatus.
Figure 2:
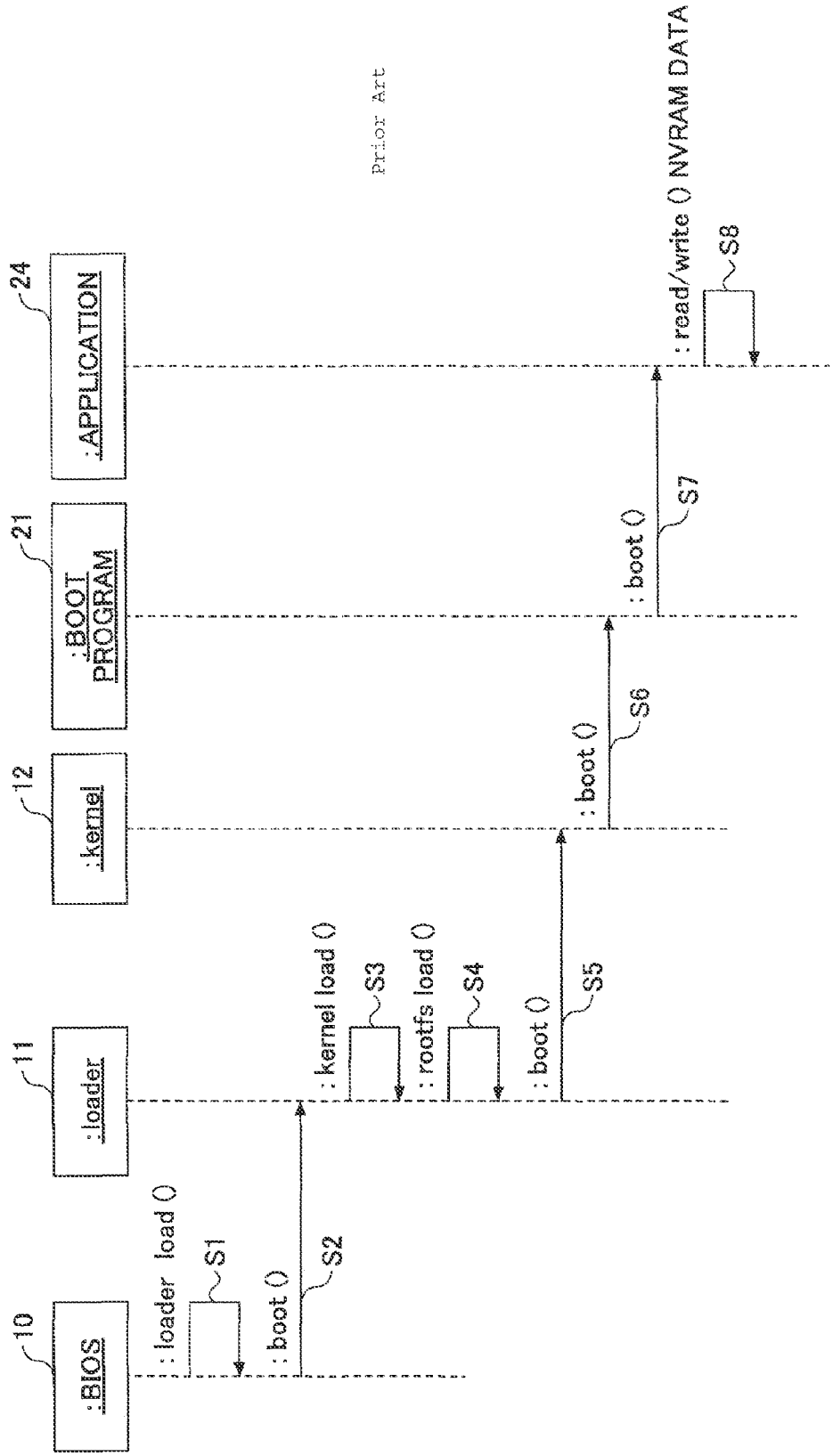
FIG. 2 is a sequence diagram showing an exemplary process of the information processing apparatus when the information processing apparatus is booted.
Figure 3:
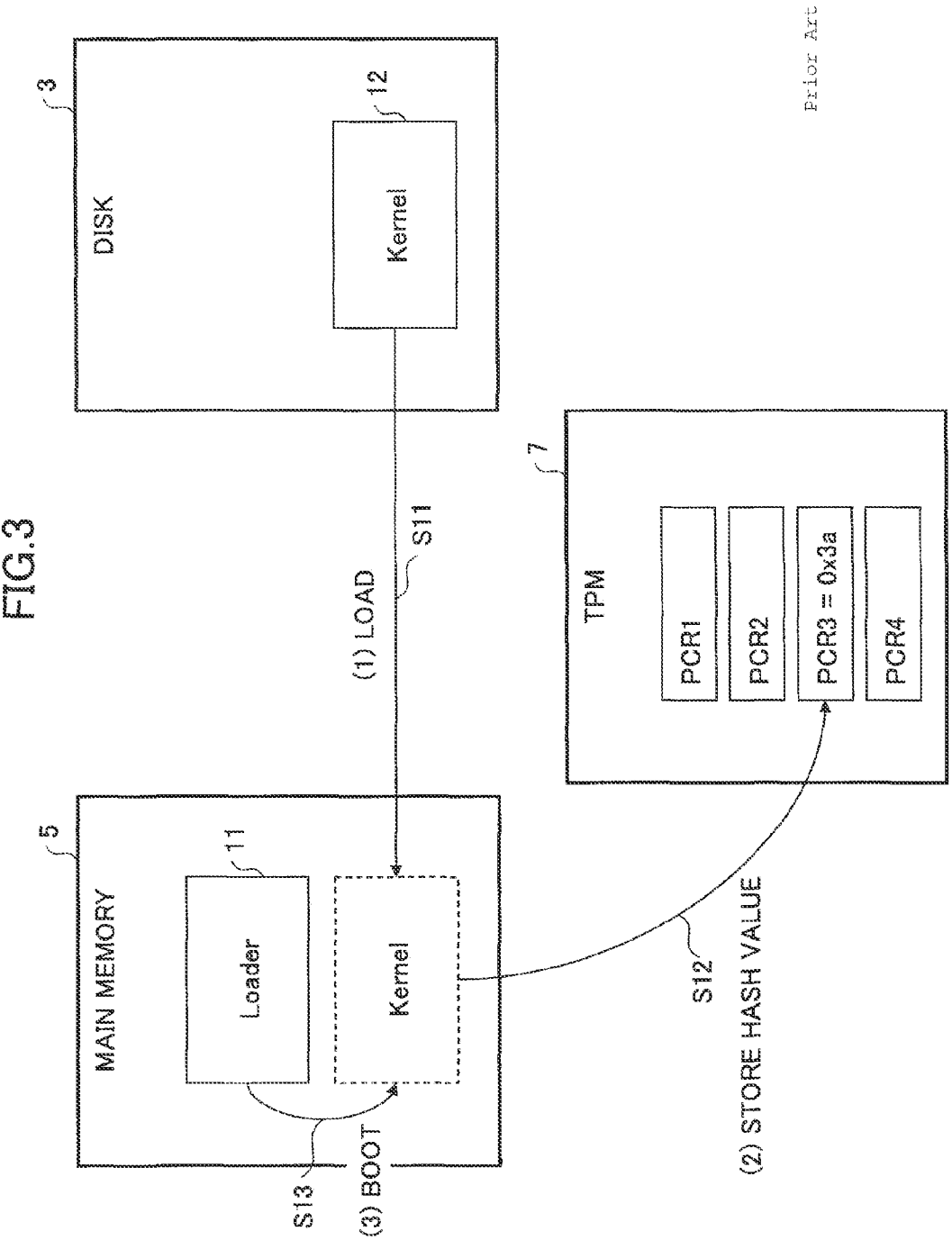
FIG. 3 is a drawing showing a process of storing a hash value in the TPM.
Figure 4:
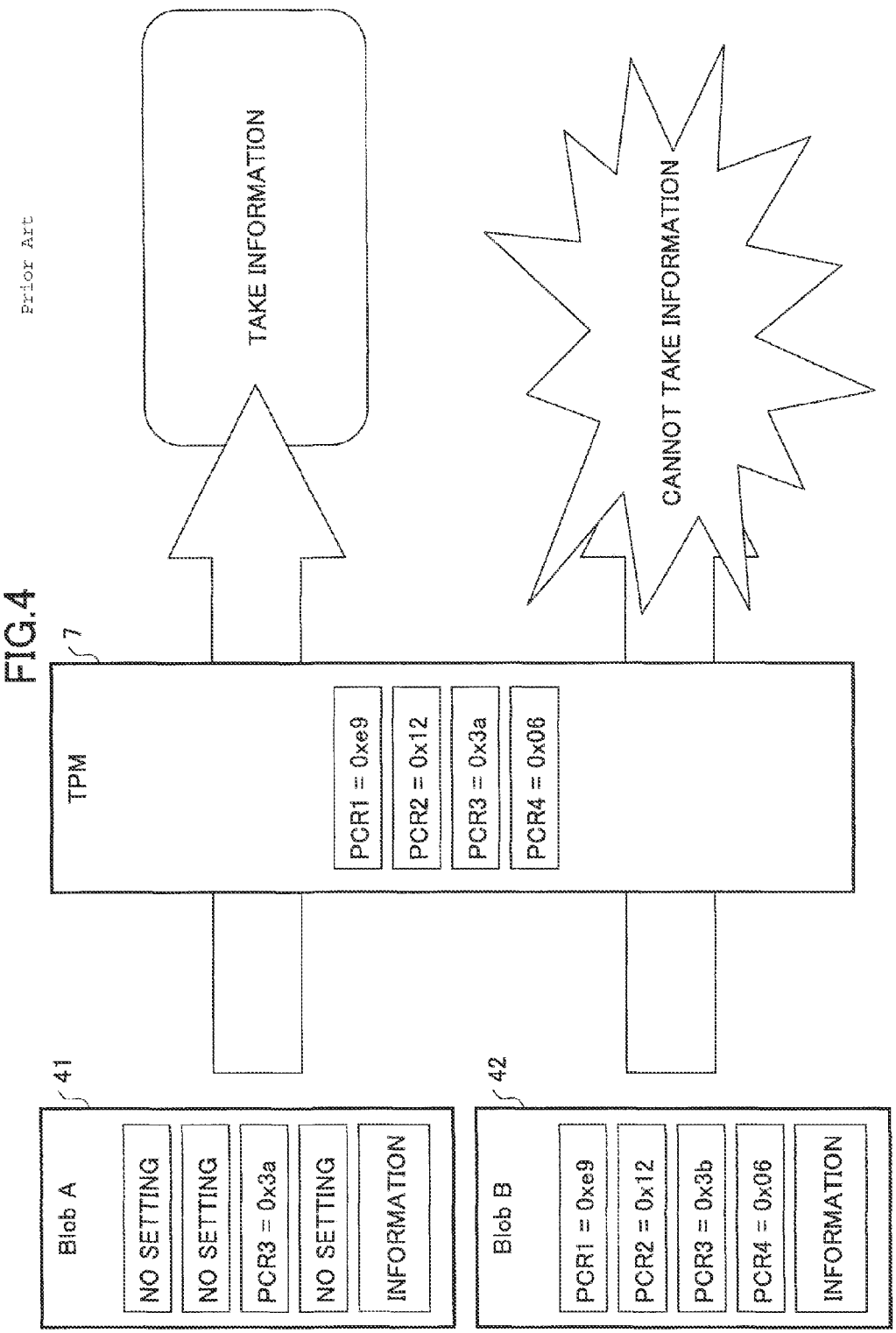
FIG. 4 is a drawing schematically showing a process of decrypting information using the TPM.
Figure 5:
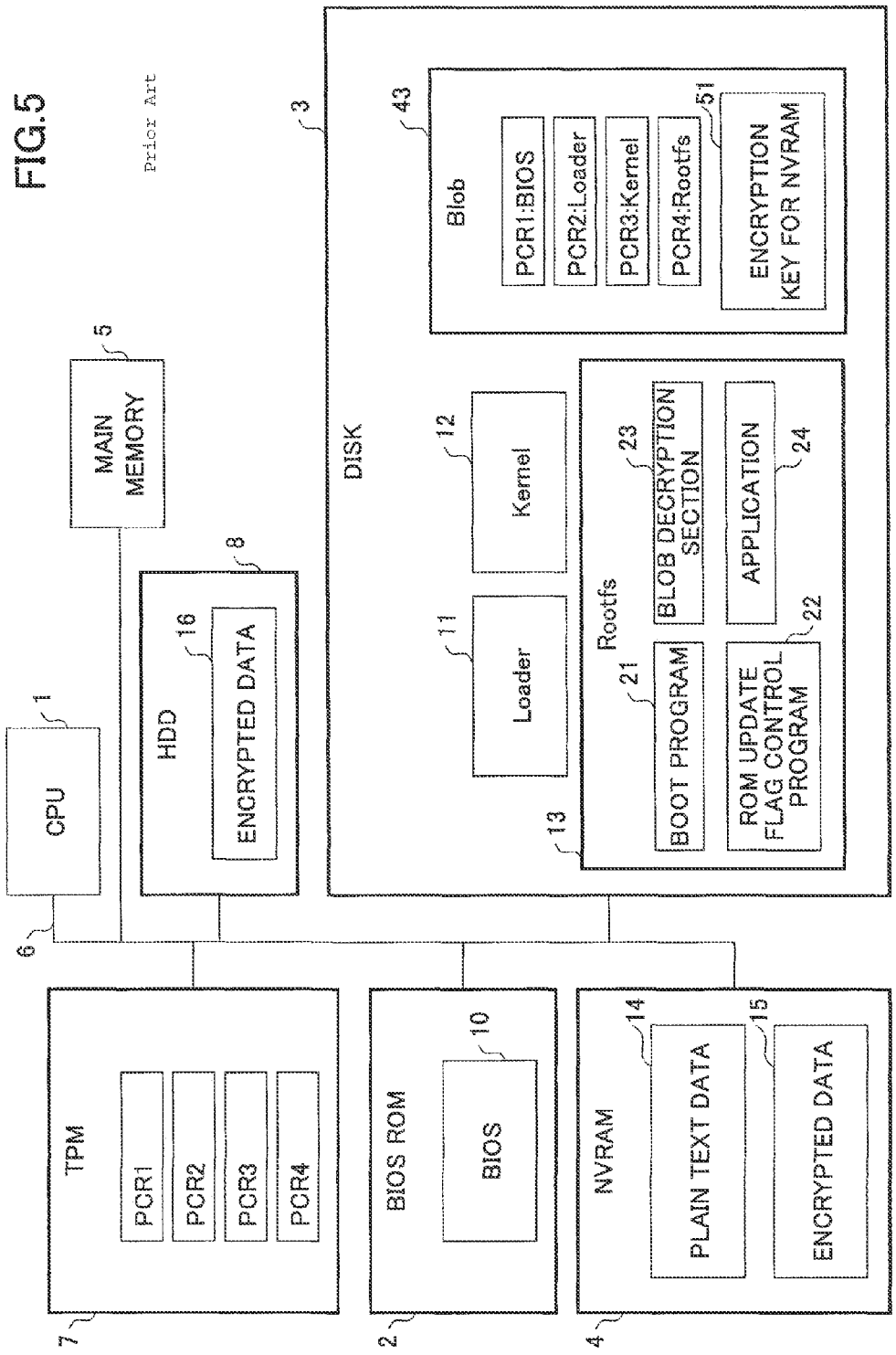
FIG. 5 is a drawing showing an exemplary configuration of a conventional information processing apparatus including the TPM.
Figure 6:
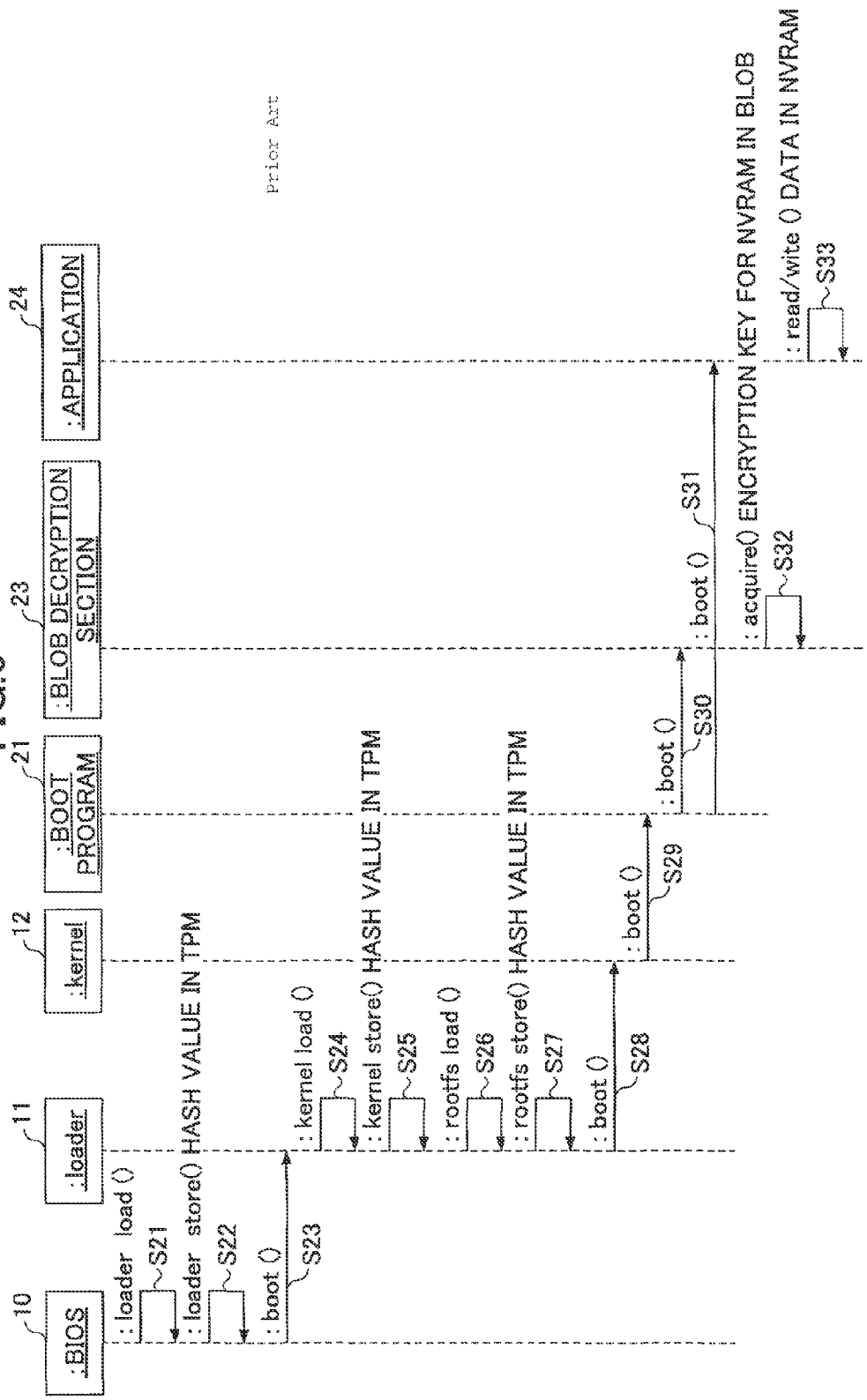
FIG. 6 is a sequence diagram showing an exemplary process of the information processing apparatus when the information processing apparatus is booted.
Figure 7:
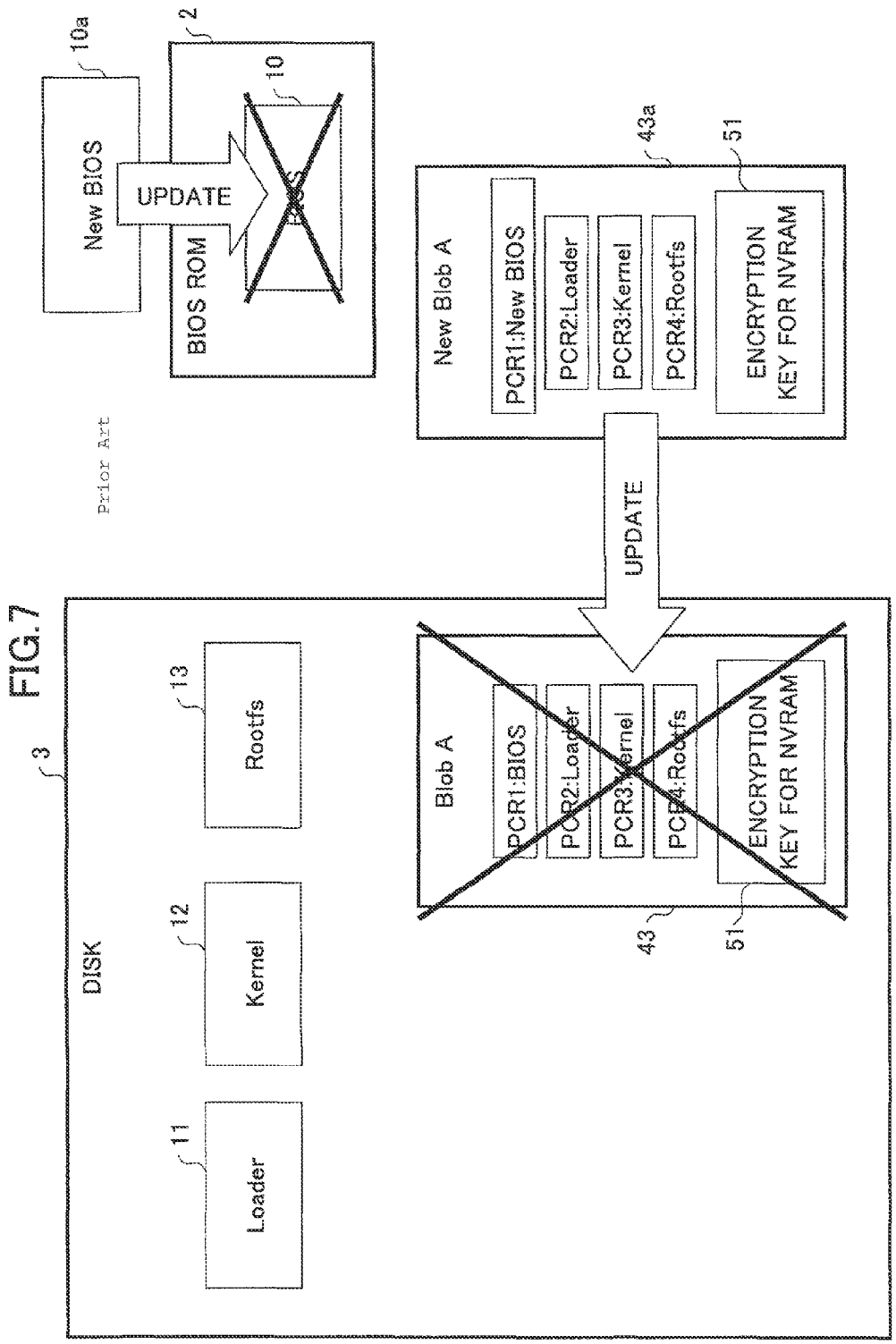
FIG. 7 is a drawing schematically showing a problem having occurred during a ROM update process.
Figure 8:
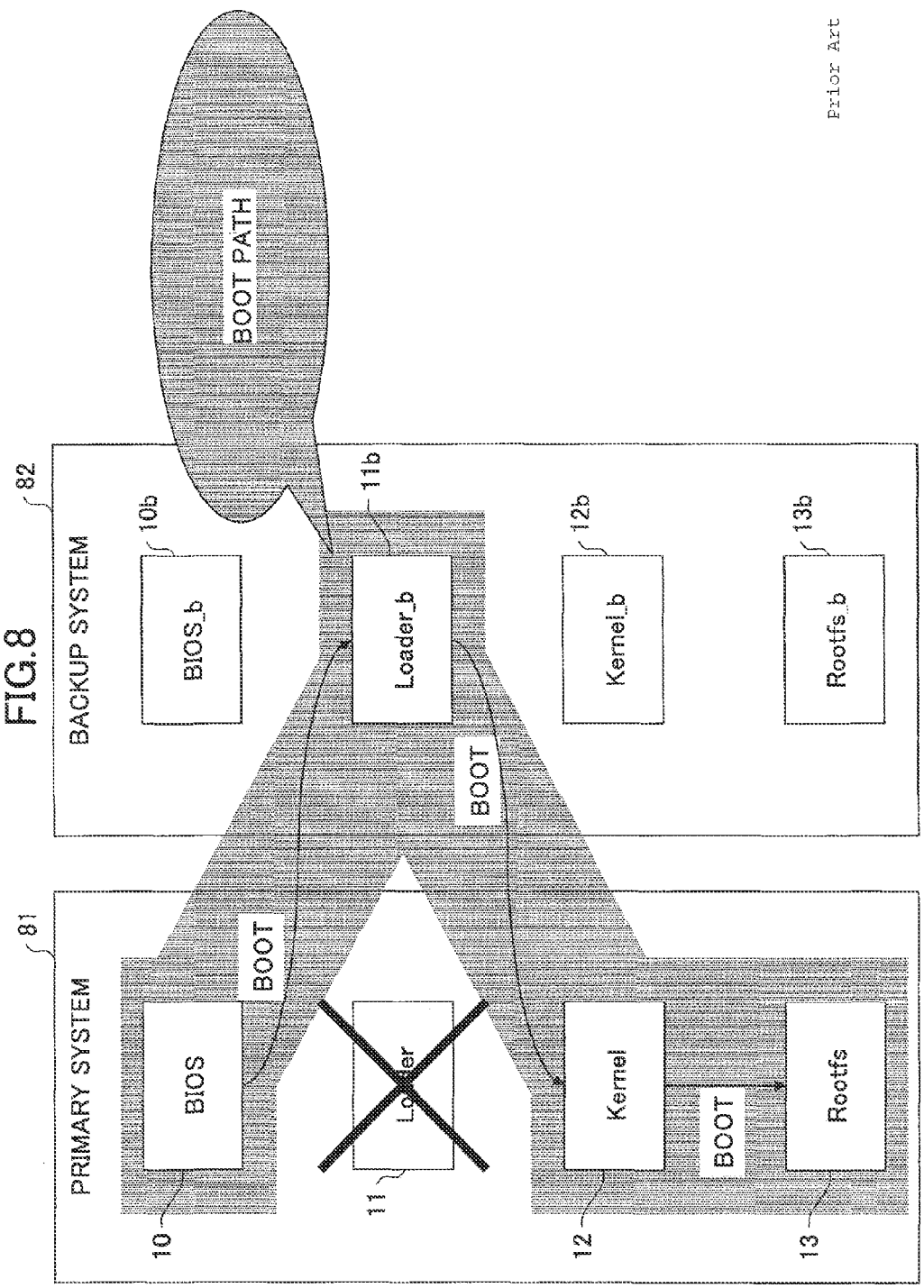
FIG. 8 is a drawing schematically showing a duplex system including a primary system and a backup system.
Figure 9:
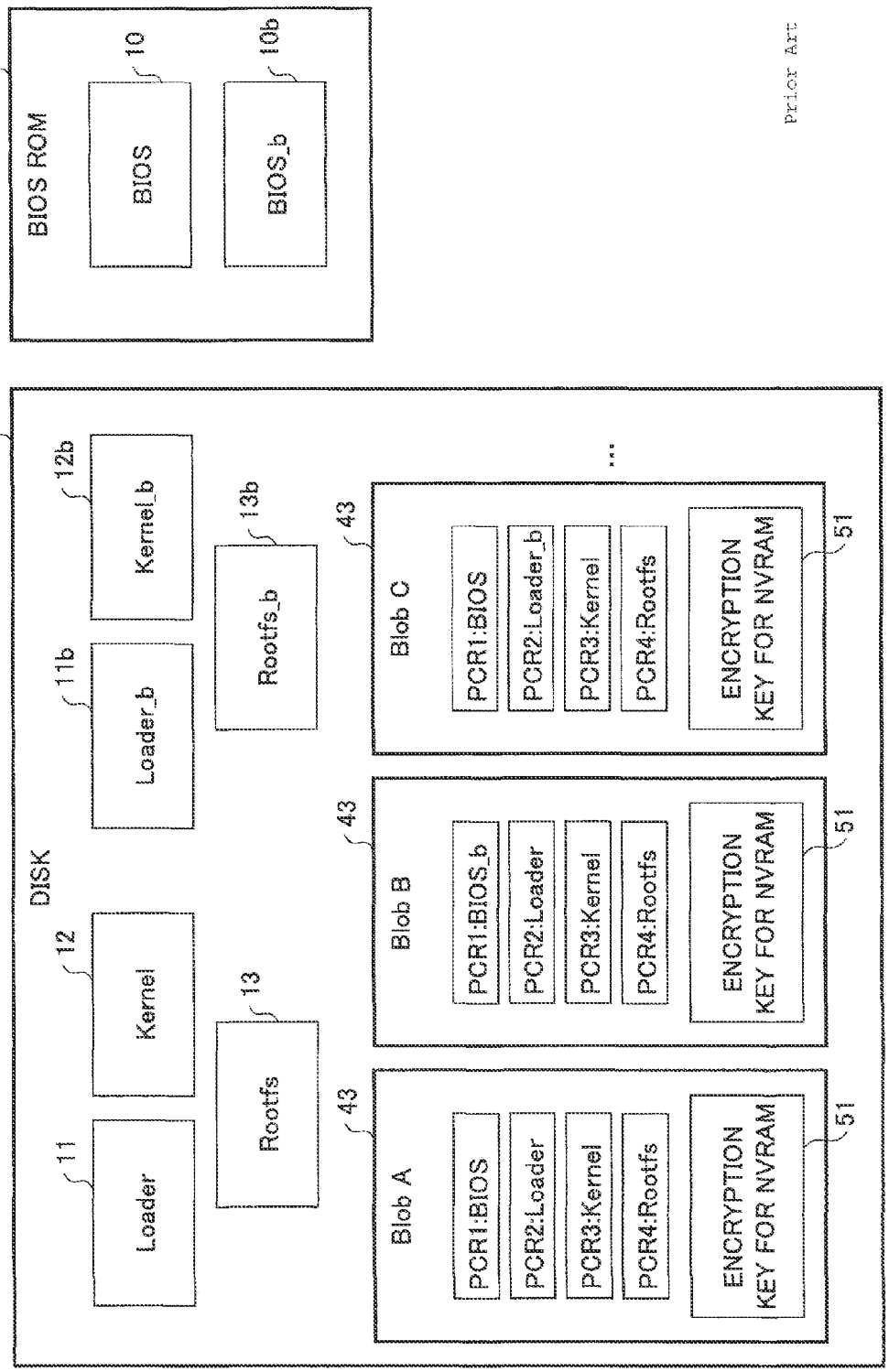
FIG. 9 is a drawing schematically showing a problem occurring when information is encrypted and decrypted using the TPM in a conventional information processing apparatus including the TPM.
Figure 10:
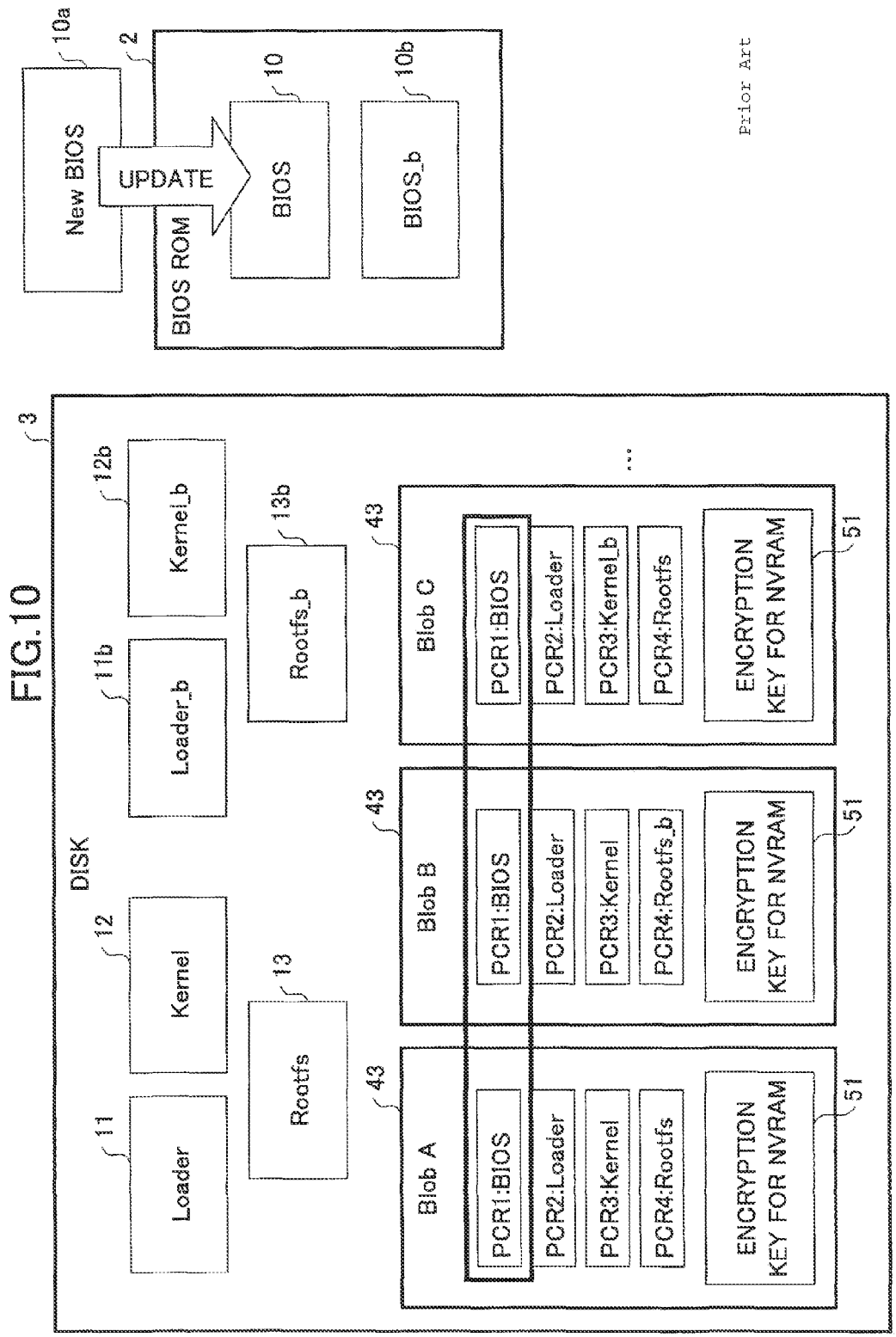
FIG. 10 is a drawing schematically showing a problem occurring when ROM is updated while information is encrypted and decrypted using the TPM in a conventional information processing apparatus including the TPM.
Figure 11:
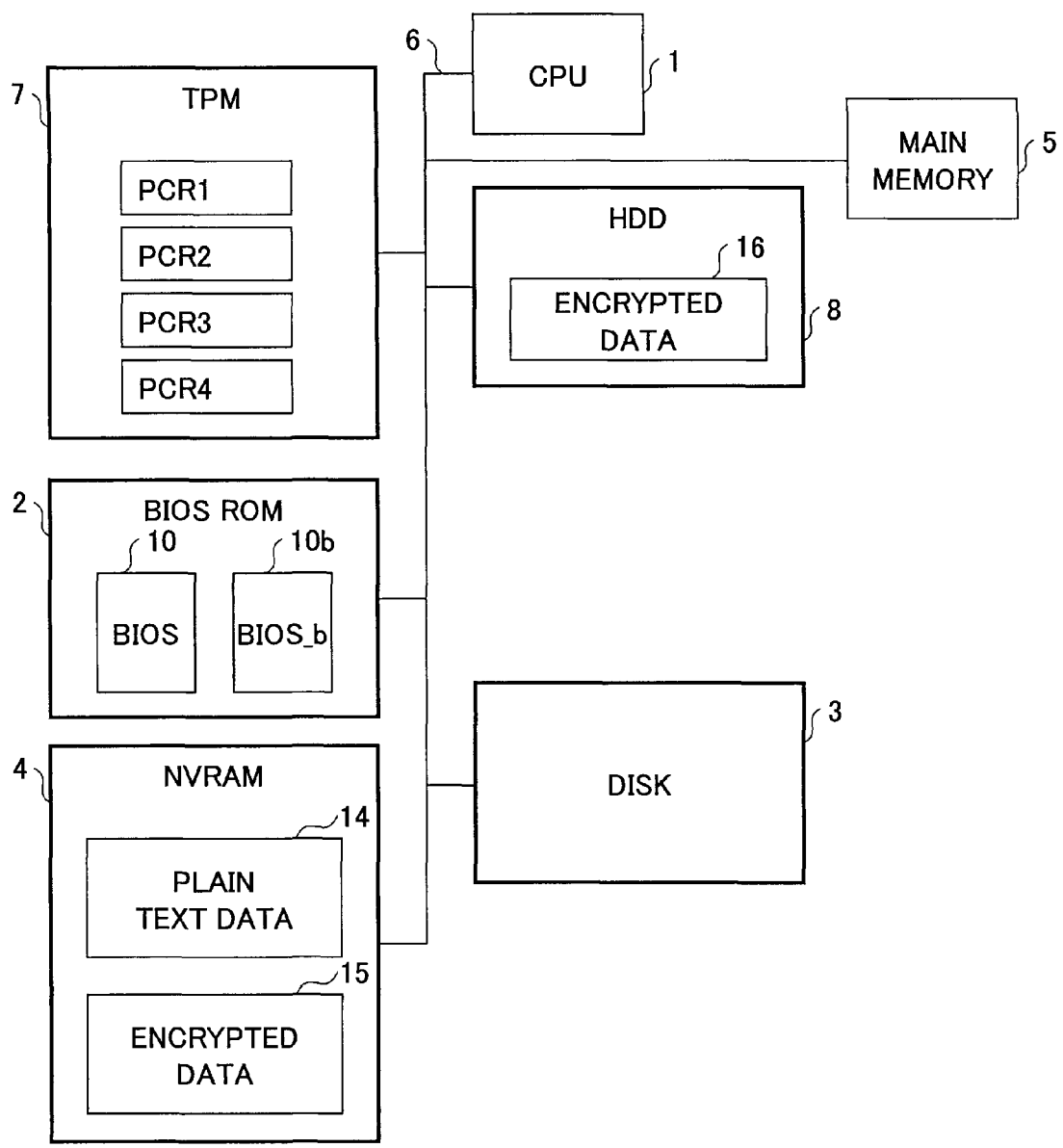
FIG. 11 is a drawing showing an exemplary configuration of an information processing apparatus according to an embodiment of the present invention.

FIG. 11 shows an exemplary configuration of an information processing apparatus according to an embodiment of the present invention. The information processing apparatus in FIG. 11 includes a CPU 1, a BIOS ROM 2, a disk 3, an NVRAM 4, a main memory 5, a TPM 7, and a HDD 8 as a hardware configuration. The CPU 1, the BIOS ROM 2, the disk 3, the NVRAM 4, the main memory 5, the TPM 7, and the HDD 8 are connected to each other via the bus 6.

The BIOS ROM 2 includes a BIOS 10 as a primary module and a BIOS 10b as a backup module. The NVRAM 4 stores plain text data 14 and encrypted data 15 that a user uses. The HDD 8 stores encrypted data 16.

Figure 12:
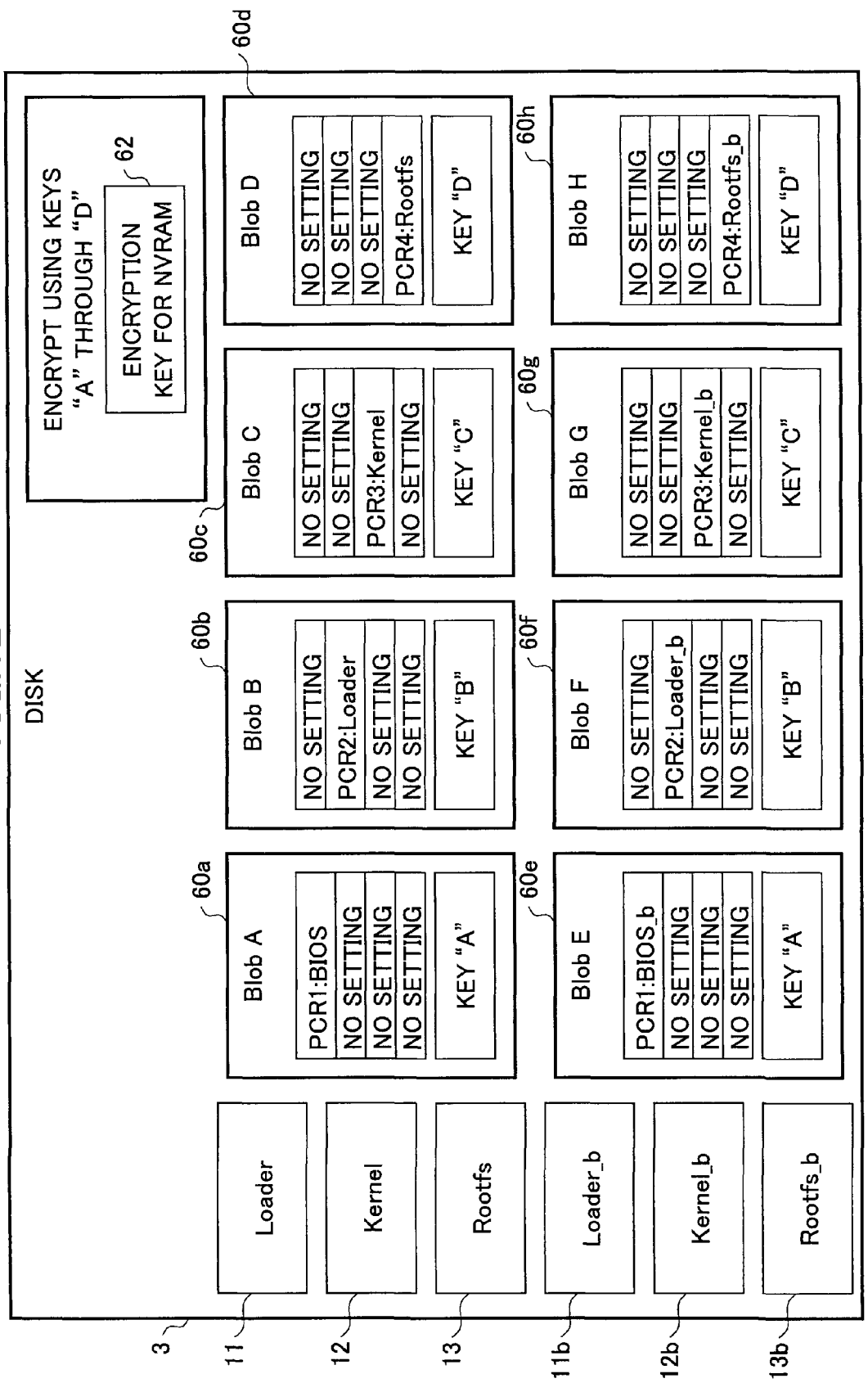
FIG. 12 is a drawing showing an exemplary module configuration of the disk of the information processing apparatus.

FIG. 12 shows an exemplary configuration of modules stored in the disk 3. In FIG. 12, the disk 3 includes a loader 11, a kernel 12, and a root file system 13 as primary modules; a loader 11b, a kernel 12b, and a root file system 13b as backup modules; Blobs 60a through 60h; and an encrypted encryption key 62 for the NVRAM 4.

The Blob 60a includes an encrypted key "A". The Blob 60b includes an encrypted key "B". The Blob 60c includes an encrypted key "C". The Blob 60d includes an encrypted key "D". The Blob 60e includes an encrypted key "A". The Blob 60f includes an encrypted key "B". The Blob 60g includes an encrypted key "C". The Blob 60h includes an encrypted key "D".

As a result, the Blob 60a and the Blob 60e have the same key "A", the Blob 60b and the Blob 60f have the same key "B", the Blob 60c and the Blob 60g have the same key "C", and the Blob 60d and the Blob 60h have the same key "D".

Further, hash values calculated based on a calculation method of generating a fixed-length pseudo random number from the BIOS 10 and 10b are stored into each "PCR1" of the Blobs 60a and 60e, respectively. In the same manner, the hash values calculated from the loader 11 and 11b are stored into each "PCR2" of the Blobs 60b and 60f, respectively. The hash values calculated from the kernel 12 and 12b are stored into each "PCR3" of the Blobs 60c and 60g, respectively. The hash values calculated from the root file system 13 and 13b are stored into each "PCR4" of the Blobs 60d and 60h, respectively.

With the configuration where Blobs 60a through 60h are provided as shown in FIG. 12, the keys A through D can be obtained when either primary modules or backup modules are booted in the boot path. Further, in the configuration where eight Blobs 60a through 60h are provided as shown in FIG. 12, the keys A through D can be obtained in any possible boot. The encryption key 62 for the NVRAM 4 is encrypted using the keys "A" through "D".

Figure 13:
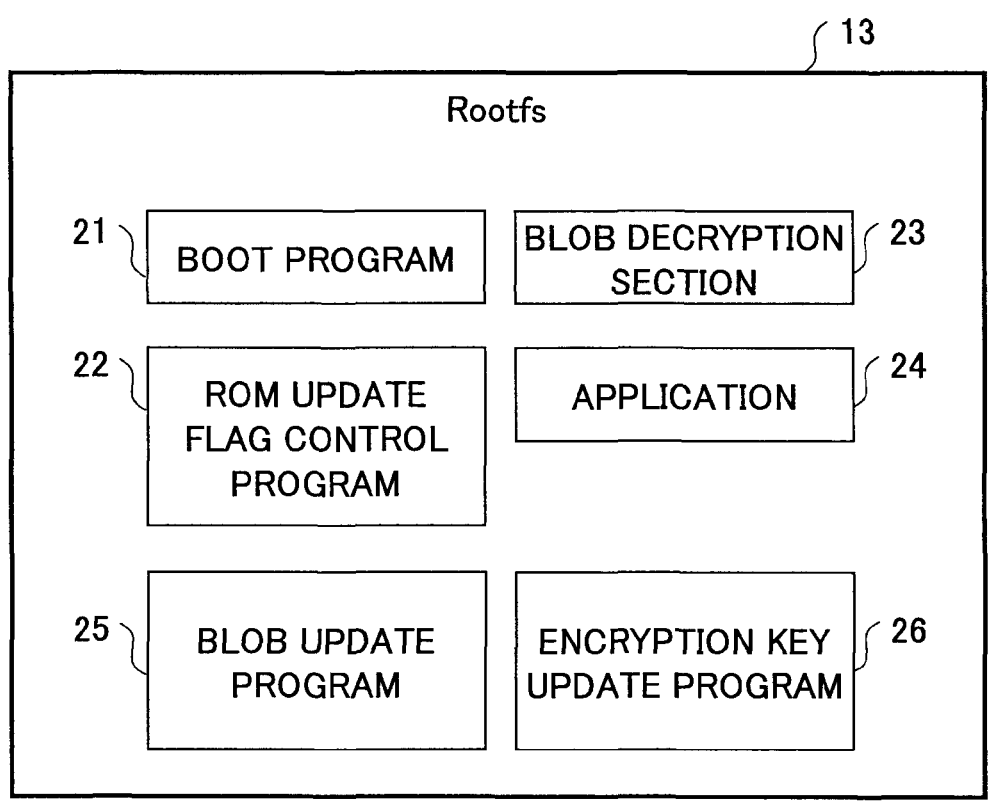
FIG. 13 is a drawing showing an exemplary module configuration in a root file system in the disk.

FIG. 13 shows an exemplary module configuration of the root files systems 13 and 13b in FIG. 12. The module configuration of the root file systems 13 and the module configuration of the root file systems 13b are identical. An explanation of the root files systems 13 is described below, and an explanation of the root files systems 13b is omitted.

The root file system 13 manages a boot program 21, a ROM update flag control program 22, a blob decryption section 23, an application 24, a blob update program 25, and an encryption key update program 26 that are stored in the disk 3.

The boot program 21 boots the application 24 in the root file system 13. The ROM update flag control program 22 controls the boot path defining a boot flow. The blob decryption section 23 acquires the keys "A" through "D" from the Blobs 60a through 60h using the TPM 7. The blob update program 25 controls the update of the Blobs 60a through 60h. The encryption key update program 26 controls the update of the encryption key 62 for the NVRAM 4.

Referring back to FIG. 11, when each kind of the primary or backup modules of the BIOS 10 or the BIOS 10b, the loader 11 or the loader 11b, the kernel 12 or the kernel 12b, and the root file system 13 or the root file system 13b is booted, the hash values of the modules used for the boot are accordingly stored in the "PCR1" through "PCR4", respectively, of the TPM 7.

That is, the hash value calculated from the BIOS 10 or 10b is stored in the "PCR1" of the TPM 7; the hash value calculated from the loader 11 or 11b is stored in the "PCR2" of the TPM 7; the hash value calculated from the kernel 12 or 12b is stored in the "PCR3" of the TPM 7; and the hash value calculated from the root file system 13 or 13b is stored in the "PCR4" of the TPM 7.

The modules including the BIOS 10 and 10b, the loader 11 and 11b, the kernel 12 and 12b, and the root file system 13 and 13b are loaded into the main memory by the CPU 1 and executed. In the following descriptions, the modules including the BIOS 10 and 10b, the loader 11 and 11b, the kernel 12 and 12b, and the root file system 13 and 13b are described as processing subjects, for explanation purposes.

Figure 14:
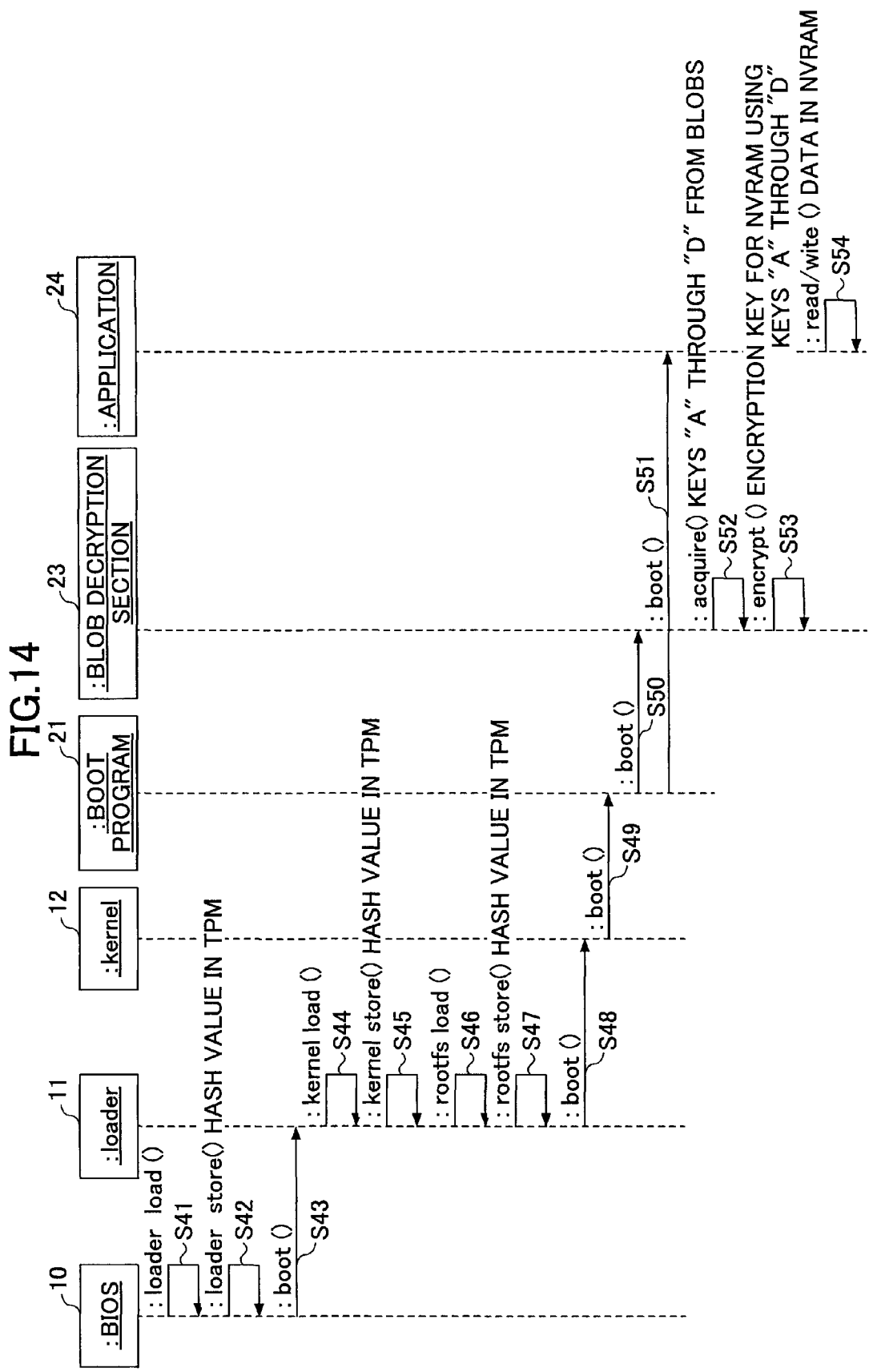
FIG. 14 is a sequence diagram showing a process of the information processing apparatus when the information processing apparatus is booted.

Next, a boot sequence of the information processing apparatus in FIG. 11 is described with reference to FIG. 14. FIG. 14 is a sequence diagram showing an exemplary booting process of the information processing apparatus according to an embodiment of the present invention. It is assumed that the hash value of the BIOS 10 is already stored in the "PCR1" of the TPM7 before step S41 in FIG. 14.

In step S41, BIOS loads the loader 11. In step S42, the hash value of the loader 11 is stored in the "PCR2" of the TPM 7. In step S43, the BIOS boots the loader 11.

In step S44, the loader 11 loads the kernel 12. In step S45, the hash value of the kernel 12 is stored in the "PCR3" of the TPM 7. In step S46, the loader loads the root file system 13. In step S47, the hash value of the root file system 13 is stored in the "PCR4" of the TPM 7.

In step S48, the loader 11 boots the kernel 12 and the root file system 13. In step S49, the kernel 12 boots the boot program 21 in the root file system 13. In steps S50 and S51, the boot program 21 boots the blob decryption section 23 and the application 24, respectively, in the root file system 13.

In step S52, the blob decryption section 23 acquires the keys "A" through "D" from the blobs 60a through 60d, respectively, using the TPM 7. In step S53, the blob decryption section 23 decrypts the encrypted encryption key 62 for the NVRAM 4 using the acquired keys "A" through "D". In step S54, the application is now capable of writing encrypted data 15 into the NVRAM 4 and reading encrypted data in the NVRAM 4 using the decrypted encryption key 62.

In the following, a specific process of ROM update and encryption key update in the information processing apparatus in FIG. 11 is described.

(ROM Update)

Figure 15:
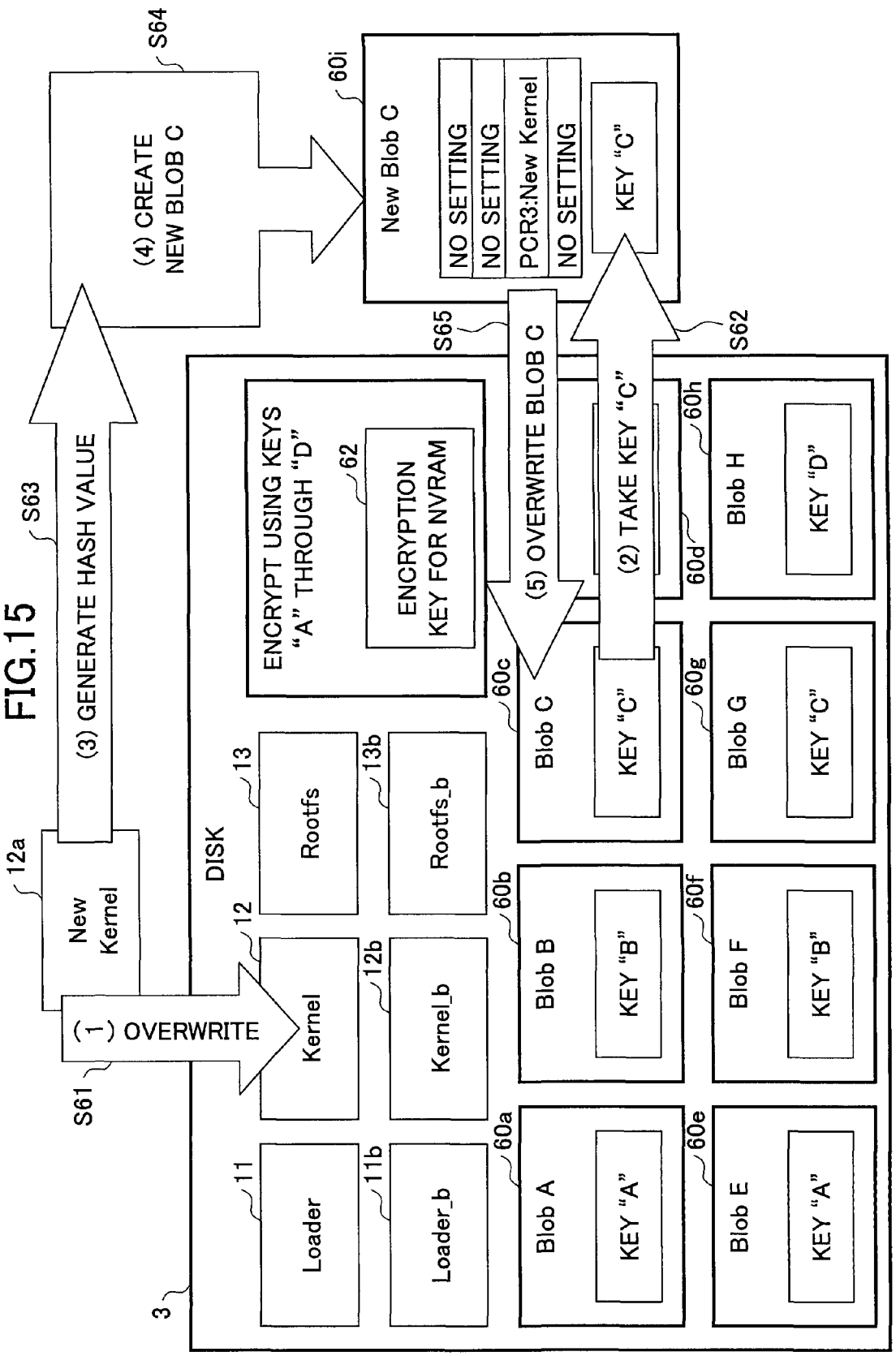
FIG. 15 is a diagram schematically showing a process of a ROM update.

FIG. 15 is a diagram schematically showing a process of the ROM update. FIG. 15 shows an example where the kernel 12 is updated to a new kernel 12a. First, the ROM update flag control program 22 changes the boot path indicating the procedure of the boot from BIOS 10→loader 11→kernel 12→root file system 13 to BIOS 10→loader 11→kernel 12b→root file system 13. Then by rebooting the information processing apparatus, the BIOS 10, the loader 11, the kernel 12b, and the root file system 13 are booted accordingly.

In step S61, the kernel 12 is replaced by the new kernel 12b. In step S62, the blob decryption section 23 acquires the key "C" from the Blob 60c using the TPM 7 in the same manner as described above.

In step S63, the blob update program 25 generates a hash value calculated from the new kernel 12a. In step S64, the blob update program 25 generates a new Blob 60i including the generated hash value. In step S65, the blob update program 25 replaces the Blob 60c by the generated Blob 60i. Then, the ROM update flag control program 22 restores the boot path to BIOS 10→loader 11→kernel 12→root file system 13.

During the process of the ROM update shown in FIG. 15, even when the update process from the Blob 60c to the Blob 60i is interrupted for some reason, since the same key "C" is stored in the Blob 60g, the key "C" can be acquired from the Blob 60g. As a result, the encrypted encryption key 62 for the NVRAM 4 can be decrypted by using the acquired keys "A" through "D", and accordingly, the encrypted data in the NVRAM 4 can be decrypted.

(Encryption Key Update)

Figure 16:
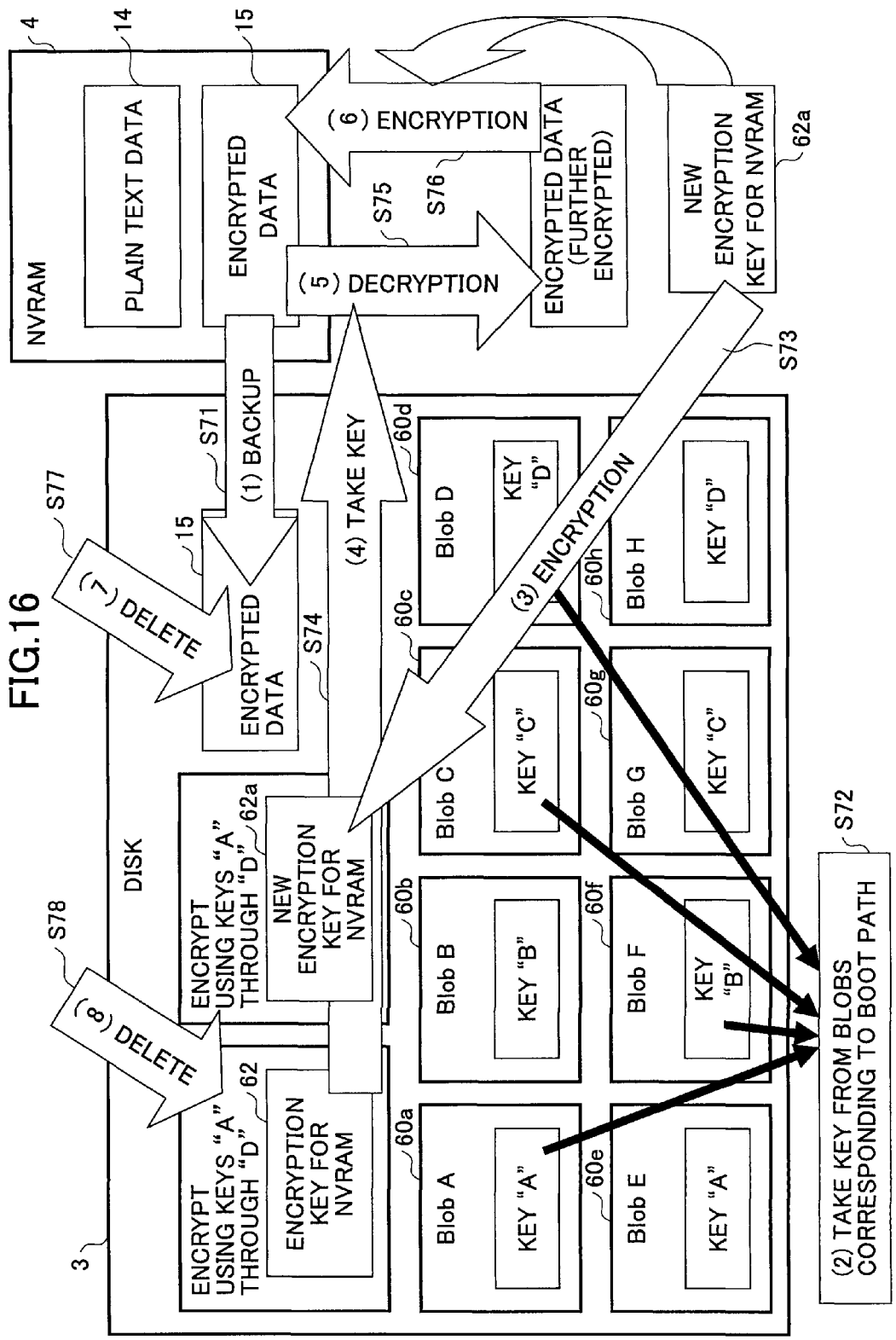
FIG. 16 is a drawing schematically showing a process of an encryption key update.

FIG. 16 is a diagram schematically showing a process of the encryption key update. In step S71, the encryption key update program 26 creates a backup copy of the encrypted data 15 in the NVRAM 4 and stores the created backup copy in the disk 3. In step S72, the blob decryption section 23 acquires the keys "A" through "D" from the Blobs 60a through 60d, respectively, corresponding to the boot path. In step S73, the encryption key update program 26 encrypts an encryption key 62a for the NVRAM 4 using the acquired keys "A" through "D", and stores the encrypted encryption key 62a in the disk 3.

In step S74, the blob decryption section 23 decrypts the encrypted encryption key 62 using the keys "A" through "D", and acquires the decrypted encryption key 62. In step S75, the encryption key update program 26 decrypts the encrypted data 15 stored in the NVRAM 4 using the decrypted encryption key 62. In step S76, the encryption key update program 26 encrypts the decrypted encrypted data 15 again using the new encryption key 62a for the NVRAM 4.

In step S77, the encryption key update program 26 deletes the encrypted data 15 stored in the disk 3 as a backup copy in step S71. In step S78, the encryption key update program 26 further deletes the encrypted encryption key 62 for the NVRAM 4 stored in the disk 3.

During the above process of the encryption key update shown in FIG. 16, even when the update from the encryption key 62 to the new encryption key 62a is interrupted, since the copy of the encrypted data 15 is stored in the disk 3 as a backup, it is possible to perform the process of the encryption key update again.

(Another Configuration of the Disk 3)

Figure 17:
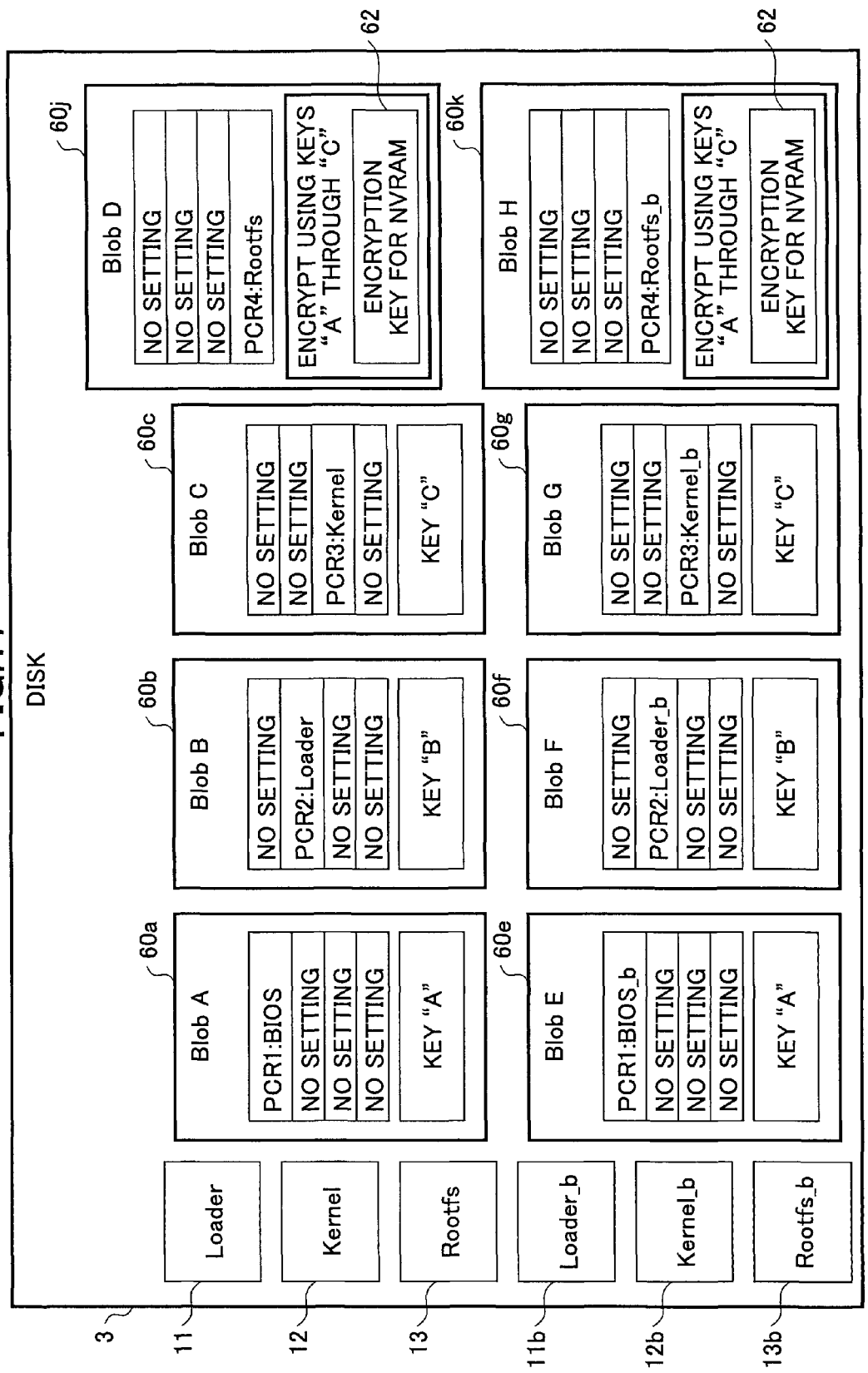
FIG. 17 is a drawing showing another module configuration of the disk in the information processing apparatus.

FIG. 17 shows another exemplary module configuration in the disk 3. The disk 3 in FIG. 17 includes primary modules of the loader 11, the kernel 12, and the root file system 13; backup modules of the loader 11b, the kernel 12b, the root file system 13b; and Blobs 60a through 60c, 60e through 60g, 60j, and 60k.

The Blob 60a includes the encrypted key "A".

The Blob 60b includes the encrypted key "B". The Blob 60c includes the encrypted key "C". The Blob 60e includes the encrypted key "A". The Blob 60f includes the encrypted key "B". The Blob 60g includes the encrypted key "C". The Blob 60j includes the encrypted encryption key 62 for the NVRAM4, the encryption key 62 being encrypted using the keys "A" through "C". The Blob 60k includes the encrypted encryption key 62 for the NVRAM4, the encryption key 62 being encrypted using the keys "A" through "C".

That is, the module configuration in FIG. 17 is different from that in FIG. 12 in that, unlike the Blobs 60d and 60h, the Blobs 60j and 60k have the encrypted encryption key 62 for the NVRAM4 encrypted by using the keys "A" through "C". Because of this configuration, for example, the blob decryption section 23 acquires the keys "A" through "C" and the encrypted encryption key 62 for the NVRAM 4 from the Blobs 60a through 60c and 60j, respectively, and decrypts the acquired encrypted encryption key 62 for the NVRAM 4 using the acquired keys "A" through "C". As a result, the encrypted data 15 in the NVRAM 4 can be decrypted.

[Embodiment 2]

In the information processing apparatus in above embodiment, should the disk 3 crash, since the encryption key 62 for the NVRAM 4 is to be lost, the encrypted data 15 in the NVRAM 4 can no longer be decrypted. To solve this problem, in an information processing apparatus according to this embodiment 2, a mechanism may be provided that permits decrypting the encrypted data 15 in the NVRAM 4 even when the disk 3 crashes.

Figure 18:
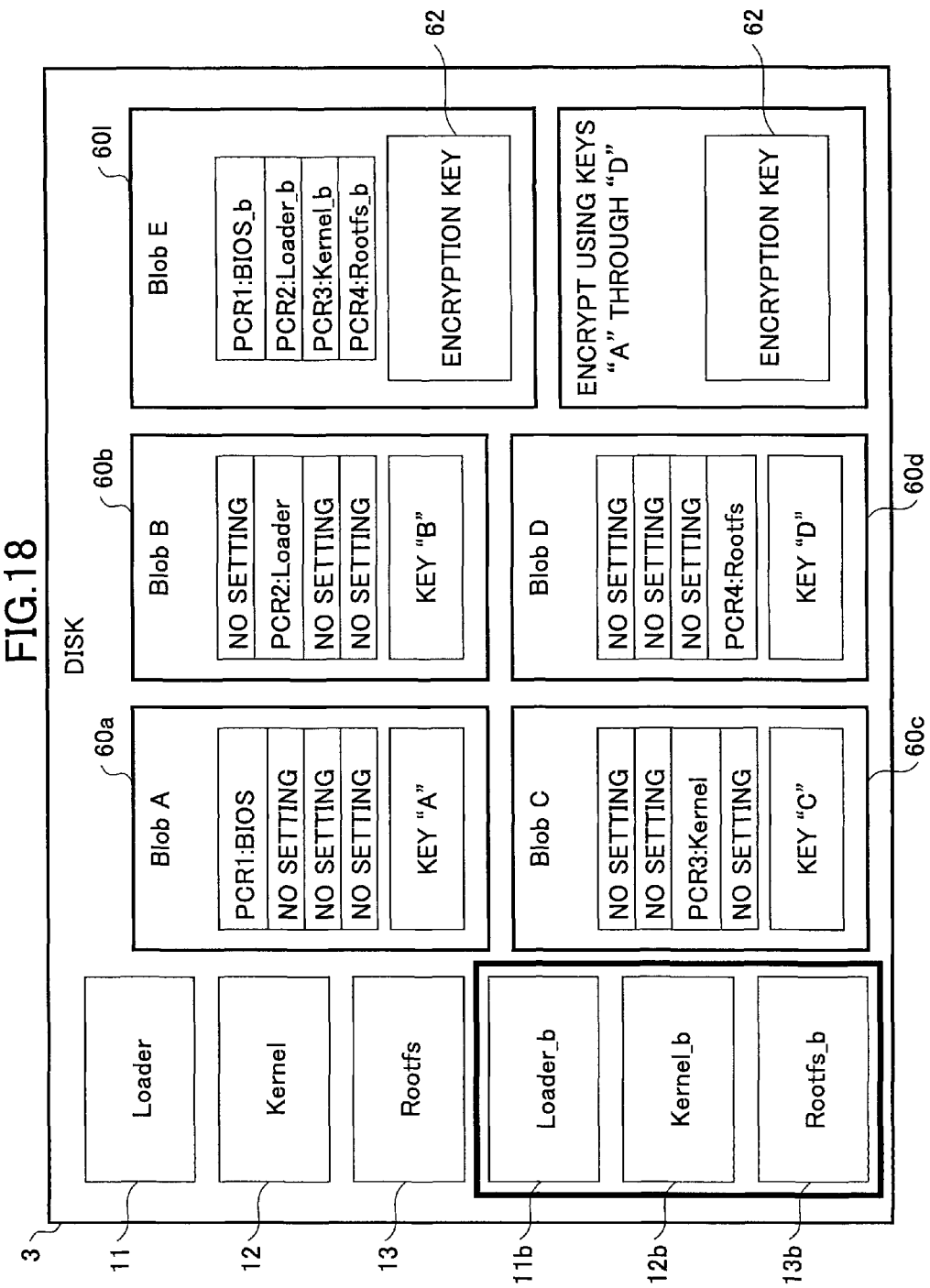
FIG. 18 is a drawing showing an exemplary module configuration of the disk in the information processing apparatus according to an embodiment of the present invention.

In the information processing apparatus in this embodiment 2, the module configuration of the disk 3 and the information stored in the NVRAM 4 and the HDD 8 are different from those in embodiment 1. FIG. 18 shows an exemplary module configuration of the disk 3 in this embodiment. The disk 3 in FIG. 18 includes the primary modules of the loader 11, the kernel 12, the root file system 13, and the root file system 13; backup modules of the loader 11b, the kernel 12b, the root file system 13b; Blobs 60a through 60d and 60l; and the encrypted encryption key 62 for the NVRAM 4. It should be noted that in the information processing apparatus in this embodiment 2, the ROM update for the backup modules of the loader 11b, the kernel 12b, the root file system 13b is not to be performed after the shipment.

The Blob 60a includes the encrypted key "A". The Blob 60b includes the encrypted key "B". The Blob 60c includes the encrypted key "C". The Blob 60d includes the encrypted key "D". The Blob 60l includes the encrypted encryption key 62 for the NVRAM 4.

In this configuration, the encryption key 62 for the NVRAM 4 can be decrypted and obtained using the keys "A" through "D" from the Blobs 60a through 60d, respectively, and can be obtained from the Blob 60l corresponding to the boot path of BIOS 10b→loader 11b→kernel 12b→root file system 13b.

Figure 19:
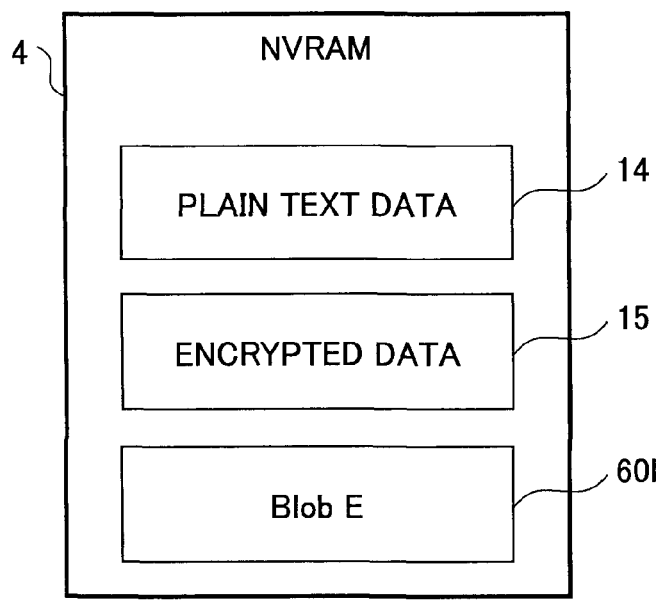
FIG. 19 is a drawing showing information stored in the NVRAM of the information processing apparatus.
Figure 20:
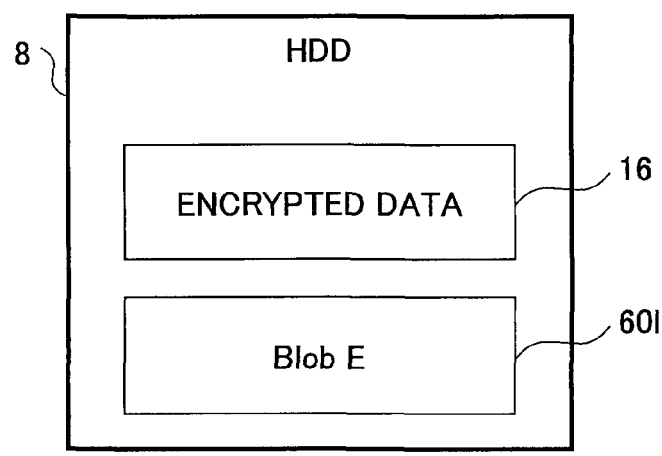
FIG. 20 is a drawing showing information stored in the HDD of the information processing apparatus.

Further, in the information processing apparatus in this embodiment 2, the Blob 60l is stored in the NVRAM 4 and the HDD 8 as shown in FIGS. 19 and 20 so as to respond to the crash of the disk 3. FIGS. 19 and 20 show the configuration of the information stored in the NVRAM 4 and the HDD 8, respectively.

FIGS. 21 and 22 are drawings showing a process of decrypting the encrypted data 15 in the NVRAM 4. In step S81, primary modules of the loader 11, the kernel 12, the root file system 13, and the backup modules of the loader 11b, the kernel 12b, the root file system 13b are installed in the disk 3.

In step S82, the ROM update flag control program 22 turns ON a backup flag 71 in the encrypted data 15 in the NVRAM 4. In step S83, the information processing apparatus reboots in a backup mode.

In step S84, the information processing apparatus boots the loader 11b, the kernel 12b, the root file system 13b (backup mode). In step S85, the blob update program 25 creates a copy of the Blob 60l stored in the NVRAM 4 and stores the created copy in the disk 3. In step S86, the blob update program creates new keys "A" through "D".

In step S87, the blob update program 25 creates Blobs 80a through 80d including the keys "A" through "D", respectively. In step S88, the blob update program 25 stores the created blobs 80a through 80d in the disk 3. In step S89, the blob decryption section 23 acquires the encryption key 62 from the Blob 60l stored in the NVRAM 4.

In step S90, the encryption key update program 26 encrypts the encryption key 62 using the keys "A" through "D" and stores the encrypted encryption key 62 in the disk 3. In step S91, the ROM update flag control program 22 turns OFF the backup flag 71 in the encrypted data 15 in the NVRAM 4.

In the process shown in FIGS. 21 and 22, even when the disk 3 crashes, the encryption key 62 can be acquired from the Blob 60l stored in the NVRAM 4, the Blob 60l corresponding to the boot path of BIOS 10b→loader 11b→kernel 12b→root file system 13b. As a result, the encrypted data 15 in the NVRAM 4 can be decrypted.

The present invention is not limited to the above-mentioned embodiments, and variations and modifications may be made without departing from the scope of the present invention.

It should be noted that the terms "value storage unit", "encryption information storage units", "information decryption unit", and "encryption information update unit" described in claims herein correspond to the TPM 7, the Blobs 60a through 60l, the blob decryption section 23, and the blob update program 25, respectively.

The present application is based on and claims the benefit of priority of Japanese Patent Application No. 2007-067250, filed on Mar. 15, 2007, the entire contents of which are hereby incorporated by reference.

What is claimed is:

1. An information processing apparatus comprising:
a duplex system for a boot path including a series of selected modules, the apparatus being booted in the boot path, the duplex system being constituted by:
a series of primary modules necessary to boot the apparatus; and
a series of backup modules corresponding to the series of primary modules, wherein each selected module of the selected modules is a primary module of a particular kind and selected from the primary modules, or is a backup module of the same particular kind and selected from the backup modules, and the primary module of the particular kind and the backup module of the same particular kind are interchangeable,
a value storage component storing values uniquely calculated from the primary modules or the backup modules used when the apparatus is booted;
an encryption information storage component storing, for each pair of a primary module of a specific module kind and a backup module of the same specific module kind in the duplex system, encrypted version of unique information unique to the specific module kind of the primary module and backup module, the unique information unique to the specific module kind in the duplex system being encrypted based on a value calculated from the primary module or the backup module of the specific module kind;
an information decryption device decrypting the encrypted version of the unique information unique to the each module kind using the values in the value storage component; and
a control device that configures the boot path to comprise the primary modules in a case in which the apparatus is being booted normally, and configures the boot path to comprise at least one of the counterpart backup modules in a case in which an error has occurred in at least one of the primary modules.

2. The information processing apparatus according to claim 1, wherein the information unique to the each kind of the primary modules or the backup modules is used for encrypting or decrypting an encryption key that is for encrypting or decrypting data used by a user.

3. The information processing apparatus according to claim 2, wherein when the encryption key is updated, the updated encryption key is first encrypted using the information unique to the each kind of the primary modules or the backup modules, the information being stored in the encryption information storage component, data used by a user is decrypted using the encryption key that is not updated in the update, and the data used by the user is encrypted using the updated encryption key.

4. The information processing apparatus according to claim 2, wherein the encryption information storage component stores the encryption key encrypted using the information unique to the each kind of the primary modules or the backup modules.

5. The information processing apparatus according to claim 2, wherein the encryption information storage component stores the encryption key encrypted based on a value uniquely calculated from the backup module that is not updated after the shipment of the apparatus.

6. The information processing apparatus according to claim 5, wherein when a module storage component storing the primary modules and the backup modules is updated, the apparatus is booted using the backup modules installed in the module storage component, new information unique to the each kind of the primary modules or the backup modules is created to reform the encryption information storage component, and
the encryption key in the encryption information storage component is decrypted by the information decryption device and encrypted using the newly created information unique to the each kind of the primary modules or the backup modules.

7. The information processing apparatus according to claim 1, wherein the information decryption device compares a value used for encryption stored in the encryption information storage component with a value in the value storage component, and
when the value used for encrypting stored in the encryption information storage component is the same as the value in the value storage component, the information decryption device decrypts the information unique to the each kind of the primary or the backup modules, the information being stored in the encryption information storage component.

8. The information processing apparatus according to claim 1, wherein the value storage component is a Trusted Platform Module (TPM).

9. A software update method for an information processing apparatus, the software update method comprising:
providing a duplex system for a boot path including a series of selected modules, the information processing apparatus being booted in the boot path, the duplex system being constituted by:
a series of primary modules to boot the apparatus; and
a series of backup modules corresponding to the series of primary modules,
wherein each selected module of the selected modules is a primary module of a particular kind and selected from the primary modules, or is a backup module of the same particular kind and selected from the backup modules, and the primary module of the particular kind and the backup module of the same particular kind are interchangeable;
storing values in a value storage component, the values being uniquely calculated from the primary modules or the backup modules used when the apparatus is booted;
storing in an encryption information storage component, for each pair of a primary module of a specific module kind and a backup module of the same specific module kind in the duplex system, encrypted version of unique information unique to the specific module kind of the primary module and backup module in the duplex system, the unique information unique to the specific module kind being encrypted based on a value calculated from the primary module or the backup module of the specific module kind;
decrypting the encrypted version of the unique information by an information decryption device, using the values in the value storage component; and
configuring, by a control device of the information processing apparatus, the boot path to comprise the primary modules in a case in which the apparatus is being booted normally, and configures the boot path to comprise at least one of the counterpart backup modules in a case in which an error has occurred in at least one of the primary modules.

10. The software update method according to claim 9, wherein the information unique to the each kind of the primary modules or the backup modules is used for encrypting or decrypting an encryption key that is for encrypting or decrypting data used by a user.

11. The software update method according to claim 10, wherein when the encryption key is updated, the updated encryption key is first encrypted using the information unique to the each kind of the primary modules or the backup modules, the information being stored in the encryption information storage component, data used by a user is decrypted using the encryption key that is not updated in the update, and the data used by the user is encrypted using the updated encryption key.

12. The software update method according to claim 10, wherein the encryption information storage component stores the encryption key encrypted using the information unique to the each kind of the primary modules or the backup modules.

13. The software update method according to claim 10, wherein the encryption information storage component stores the encryption key encrypted based on a value uniquely calculated from the backup module that is not updated after the shipment of the apparatus.

14. The software update method according to claim 13, wherein when a module storage component storing the primary modules and the backup modules is updated, the apparatus is booted using the backup modules installed in the module storage component, new information unique to the each kind of the primary modules or the backup modules is created to reform the encryption information storage component, and the encryption key in the encryption information storage component is decrypted by the information decryption device and encrypted using the newly created information unique to the each kind of the primary modules or the backup modules.

15. The software update method according to claim 9, wherein the information decryption device compares a value used for encryption stored in the encryption information storage component with a value in the value storage component, and when the value used for encrypting stored in the encryption information storage component is the same as the value in the value storage component, the information decryption device decrypts the information unique to the each kind of the primary or the backup modules, the information being stored in the encryption information storage component.

16. The software update method according to claim 9, wherein the value storage component is a Trusted Platform Module (TPM).

17. An image processing apparatus comprising:
a plotter section;
a scanner section;
a duplex system for a boot path including a series of selected modules, the apparatus being booted in the boot path, the duplex system being constituted by:
a series of primary modules necessary to boot the apparatus; and
a series of backup modules corresponding to the series of primary modules,
wherein each selected module of the selected modules is a primary module of a particular kind and selected from the primary modules, or is a backup module of the same particular kind and selected from the backup modules, and the primary module of the particular kind and the backup module of the same particular kind are interchangeable;
a value storage component storing values uniquely calculated from the primary modules or the backup modules used when the apparatus is booted;
an encryption information storage component storing, for each pair of a primary module of a specific module kind and a backup module of the same specific module kind in the duplex system, encrypted version of unique information unique to the specific module kind of the primary module and backup module, the unique information unique to the specific module kind being encrypted based on a value calculated from the primary module or the backup module of the specific module kind in the duplex system;
an information decryption device decrypting the encrypted version of the unique information unique to the each module kind using the values in the value storage component; and
a control device that configures the boot path to comprise the primary modules in a case in which the apparatus is being booted normally, and configures the boot path to comprise at least one of the counterpart backup modules in a case in which an error has occurred in at least one of the primary modules.

* * * * *